United States Patent
Collins et al.

(10) Patent No.: US 11,761,461 B2
(45) Date of Patent: Sep. 19, 2023

(54) ROTARY SERVO VALVE

(71) Applicant: DOMIN FLUID POWER LIMITED, Bristol (GB)

(72) Inventors: Andrew Collins, Bristol (GB); Martin MacDonald, Bristol (GB)

(73) Assignee: DOMIN FLUID POWER LIMITED, Bristol (GB)

( * ) Notice: Subject to any disclaimer, the term of this patent is extended or adjusted under 35 U.S.C. 154(b) by 111 days.

(21) Appl. No.: 17/427,820

(22) PCT Filed: Feb. 5, 2020

(86) PCT No.: PCT/GB2020/050254
§ 371 (c)(1),
(2) Date: Aug. 2, 2021

(87) PCT Pub. No.: WO2020/161486
PCT Pub. Date: Aug. 13, 2020

(65) Prior Publication Data
US 2022/0136533 A1     May 5, 2022

(30) Foreign Application Priority Data

Feb. 5, 2019   (GB) ........................ 1901595
Feb. 5, 2019   (GB) ........................ 1901597

(51) Int. Cl.
| | | |
|---|---|---|
| *F15B 13/04* | (2006.01) | |
| *F16K 11/076* | (2006.01) | |
| *F16K 39/04* | (2006.01) | |
| *F15B 13/043* | (2006.01) | |
| *F15B 13/044* | (2006.01) | |

(52) U.S. Cl.
CPC ........ *F15B 13/0406* (2013.01); *F15B 13/043* (2013.01); *F15B 13/044* (2013.01); *F16K 11/076* (2013.01); *F16K 39/045* (2013.01); *F15B 2013/0409* (2013.01)

(58) Field of Classification Search
CPC .... F16K 11/076; F16K 39/045; F15B 13/044; F15B 13/043; F15B 13/0306
See application file for complete search history.

(56) References Cited

U.S. PATENT DOCUMENTS

| | | |
|---|---|---|
| 2,917,080 A | 12/1959 | Hatch |
| 2,946,348 A | 7/1960 | North |
| (Continued) | | |

FOREIGN PATENT DOCUMENTS

| | | |
|---|---|---|
| EP | 0083490 A2 | 7/1983 |
| EP | 0 102 884 A1 | 3/1984 |
| (Continued) | | |

OTHER PUBLICATIONS

International Search Report issued in International Application No. PCT/GB2020/050254, dated Jul. 6, 2020.
(Continued)

*Primary Examiner* — Kevin R Barss
(74) *Attorney, Agent, or Firm* — Charles C. Achkar; Ostrolenk Faber LLP.

(57) ABSTRACT

A rotary servo valve comprising a housing portion (105) defining a cylindrical cavity (107) and a first layer of ports. The rotary servo valve further comprises two opposing indented sides and two opposing sides having an increased radius relative to the indented sides, each side of increased radius extending between the two indented sides. The spool portion (103) is mounted for rotation relative to the cylindrical cavity (107), from a neutral position so as to prevent fluid flow through the valve, to an open position in which a fluid flow path is provided.

18 Claims, 16 Drawing Sheets

(56) References Cited

U.S. PATENT DOCUMENTS

| | | | |
|---|---|---|---|
| 3,022,772 A | | 2/1962 | Zeigler et al. |
| 4,464,976 A | | 8/1984 | Tyler |
| 4,593,719 A | * | 6/1986 | Leonard .................... F16K 3/36 |
| | | | 137/625.66 |
| 5,165,448 A | | 11/1992 | Handte |
| 5,467,800 A | | 11/1995 | Sallas |
| 5,954,093 A | * | 9/1999 | Leonard .............. F15B 13/0406 |
| | | | 137/625.22 |
| 7,832,427 B2 | | 11/2010 | Coley |

FOREIGN PATENT DOCUMENTS

| | | | |
|---|---|---|---|
| EP | 0900981 A2 | 10/1997 | |
| GB | 1029299 A | 5/1966 | |
| GB | 2 141 263 A | 12/1984 | |
| WO | WO 2016/075491 A1 | 5/2016 | |

OTHER PUBLICATIONS

Written Opinion of the International Searching Authority issued in International Application No. PCT/GB2020/050254, dated Jul. 6, 2020.
GB Search Reported issued in counterpart application No. GB 1901595, dated Jul. 25, 2019.
GB Search Reported issued in counterpart application No. GB1901597.3, dated Jul. 25, 2019.

* cited by examiner

ROTARY SERVO VALVE

CROSS REFERENCE TO RELATED APPLICATIONS

The present application is a § 371 National Phase application based on PCT/GB2020/050254 filed Feb. 5, 2020, which claims the benefit of GB Application No. 1901595.7, filed Feb. 5, 2019 and GB Application No. 1901597.3, filed Feb. 5, 2019, the subject matter of each of which is incorporated by reference in their entirety.

FIELD OF THE INVENTION

The present invention concerns improvements in and relating to servo valves. More particularly, the present invention concerns an improved spool and housing design for a rotary servo valve and an improved two-stage valve using such a rotary servo valve.

BACKGROUND OF THE INVENTION

Servo valves are used in a wide variety of industries to control the movement of hydraulic or pneumatic actuators in response to an input signal and are employed in industries where precise control of an actuator is required, for example in the aerospace industry. Servo valves alter the flow of a fluid through the valve in order to control the position, velocity, acceleration or force generated by an actuator, for example a hydraulic or pneumatic cylinder or motor.

A servo valve typically comprises a moving element (spool) and a fixed element (for example a housing, sleeve or manifold) including fluid inlets and outlets. The relative movement of these two elements controls the flow of fluid through the valve.

A rotary servo valve typically comprises a spool mounted for rotation relative to the fixed element defining the fluid inlets and outlets. By rotating the spool relative to the fluid inlets and outlets a flow path between the fluid inlets and outlets may be provided or altered thereby allowing control of the flow of fluid through the valve.

A linear servo valve typically comprises a spool mounted for axial displacement relative to the fixed element defining the fluid inlets and outlets. By moving the spool back and forth relative to the inlets and outlets a flow path between the fluid inlets and outlets may be provided or altered thereby allowing control of the flow of fluid through the valve.

Rotary servo valves commonly have either a "single-stage" design, in which the spool is driven by a motor (usually an electric motor) coupled, usually via reduction gearing, to the spool, or a "two-stage" design, in which the spool is driven by a separate pilot stage. An advantage provided by single-stage valves compared to two-or-more-stage valves, is lack of sensitivity to changes in supply pressure or viscosity. Single-stage valves are often useful in applications where pilot flow for first-stage operation is not available; however, they cannot typically generate the high spool driving forces of piloted two-stage valves.

Use of rotary servo valves has been limited in high-power fluid systems because rotary servo valves tend to be less efficient than linear servo valves as a result of greater operating friction. However, they provide the advantage of being easier to couple to rotary electrical motors.

A known rotary servo valve design has a housing including pairs of ports diametrically opposed around a central rotating spool. The pressure in each port is duplicated and supplied to the diametrically opposed port. As the spool rotates, different pathways are progressively opened and closed between ports at different pressures.

A problem with such a design is that the pressurised fluid inflow acts to produce radial loads on the spool, generating imbalances and causing energy losses through operating friction. In addition, torsional loads are created on the spool in accordance with the "Bernoulli effect" as fluid flows around the spool. The need to withstand these loads may dictate the sizing of various components in the valve, and accordingly it would be advantageous to reduce these loads to enable a reduction in the size and/or weight of the valve.

The present invention seeks to mitigate the above-mentioned problems. Alternatively or additionally, the present invention seeks to provide an improved servo valve.

SUMMARY OF THE INVENTION

The present invention provides, according to a first aspect, a rotary servo valve for controlling fluid flow, the servo valve comprises one or more of: a housing portion defining a cylindrical cavity and a first layer of ports. The first layer of ports has three pairs of ports, including a first pair of service ports. The ports of each pair are arranged so as to be diametrically opposed about the cylindrical cavity; and a spool portion that may comprise two opposing indented sides and two opposing sides having an increased radius relative to the indented sides. Each side of increased radius extends between the two indented sides. The spool portion may be mounted for rotation relative to the cylindrical cavity, from a neutral position in which each side of increased radius blocks at least one port so as to prevent fluid flow through the valve, to an open position in which a fluid flow path is provided between each service port of the first pair and a corresponding one of the remaining ports. Each fluid flow path is defined at least in part by one of the indented sides.

Providing three pairs of ports, wherein the ports of each pair are on opposite sides of the cavity may allow the radial forces on the spool to be better balanced. The spool and port arrangement described above may allow the flow along opposing indented sides to be in opposite directions, thereby producing a clockwise torque on one side and an anticlockwise torque on the other side which leads to a reduction in overall torque loads on the spool for a given flow as the opposing torques may counteract each other. Providing a spool within two indented sides that define the flow paths through the cavity/spool may allow for a reduction in torque loads for a given flow as the pressure force generated by flow over the indented side is located close to the axis of rotation of the spool. Reducing loading on the spool may allow for a given flow rate to be achieved with a smaller and/or lighter valve (for example by reducing the size of motor required to counteract the torque and/or allowing for smaller components) and/or may increase the life of a valve. Each pair of ports may comprise two ports of the same type, for example two return ports, two pressure ports and/or two service ports. Where there are two types of service ports in a valve, for example two first service ports and two second service ports, a pair may comprise two service ports of the same type.

It will be appreciated that, as used herein, the radius refers to the radial distance from the centre of the spool to the outer surface of the spool.

Each side of increased radius may have a radius no smaller than the maximum radius of the indented side. Each side of increased radius may have such a radius along the whole of the length of the side. Thus, at any point on a side of increased radius, the radius may be no less than the maximum radius of the indented side.

Each side of increased radius may have a radius that is constant along the length of the side. Thus, each side of increased radius may have a constant radius. Each side of increased radius may be a convex side, for example an arced side.

Each side of increased radius may have a radius that varies along the length of the side, provided that variable radius is no less than the maximum radius of the indented sides.

Each indented side may define a portion of the flow path between two ports. Thus, in use, fluid may flow over at least part, for example all, of the indented side. Each indented side may define a fluid flow control surface, on which the fluid flow properties can be varied to control the loads acting on the spool.

Each indented side may have a radius that varies along the length of the side. The radius of each side may reduce from a maximum radius adjacent at the end of the side (i.e. in the region adjacent to a side of increased radius), to a minimum radius located mid-way along the side. Each indented side may be a concave side, for example the rate of variation of the radius with respect to length may decrease from a maximum at the end of the side to a minimum mid-way along the side. Such a side may provide improved fluid flow, for example with reduced turbulence.

Each indented side may be a straight side. Each indented side may be defined by a chord of a notional cylindrical spool portion, that is to say a straight line whose endpoints both lie on the circumference of the notional spool. The two indented sides may extend parallel to each other. The two indented sides may be symmetrical.

Each side of increased radius extends between the two indented sides. Thus, the circumference of the spool may comprise two sides of increased radius and two indented sides only.

The housing portion may define only three pairs of ports, or may alternatively define a minimum of three pairs of ports. Each set of three pairs of ports may be referred to as a layer. Thus, the housing portion may define a layer of ports, each layer of ports having three pairs of ports. The ports of a layer may be spaced apart along the axis of the spool form the ports of any other layer (if present). The three pairs of ports may be arranged around the circumference of the cavity. The three pairs of ports may be located at substantially the same axial position along the length of the spool and/or cavity.

When the spool is in the open position, a fluid flow path may be provided between the first pair of service ports and a pair of the remaining two pairs of ports. The other of the remaining two pairs of ports may be blocked, for example by the spool, for example by the sides of increased radius.

The three pairs of ports may be the first pair of service ports, a second pair of service ports and either one pair of pressure ports or one pair of return ports. In the open position, a fluid flow path may be provided between the pressure or service ports (depending on which is present) and the first service ports. Thus for example, when the spool is rotated to the open position, a fluid flow path may be provided from pressure to service. It may be that when the spool is rotated to the open position the second pair of service ports is blocked, for example by the sides of increased radius.

The spool portion may be located within the cavity such that there is substantially no gap between the surface of the spool where the indented side is not present and the inner surface of the cavity. The majority of the surface of the spool may be in contact, as herein defined, with the inner surface of the cavity. "in contact" as herein defined means that any gap between the inner surface of the cavity and the surface of the spool is small enough that internal leakage of fluid is less than 5% of the flow through the valve. Therefore fluid flow around the spool, other than via the indented sides, may be prevented. Thus, contact between the spool and the inner surface of the housing that defines the cavity may be defined as the spool and the inner surface of the housing being sufficiently close together to prevent significant flow between the inner surface of the cavity and the surface of the spool. For example, the clearance between the spool and the inner surface may be 5 μm or less. In this way precise control of the fluid flow through the valve is achievable, as the amount of flow is the result of the degree of alignment between the groove and the fluid inlet/outlet.

A pressure port may be defined as a port that, in use, is in fluid communication with a pressurised supply of fluid. The pressure port may be connected to the pressurised supply via the housing and/or a manifold (if present).

A return port may be defined as a port that, in use, is in fluid communication with a fluid return having a lower pressure than the pressurised supply. The return port may be connected to the return via the housing and/or a manifold (if present).

A service port may be defined as a port that, in use, is in fluid communication with the system element to be controlled by the servo valve. The system element may be a second stage valve, a hydraulic actuator and/or a hydraulic motor. Depending on the nature of the actuator and the state of operation of the valve, a service port may be a fluid inlet or a fluid outlet. The service port may be connected to the system element via the housing and/or a manifold (if present). The servo valve may comprise a single type of service port (a first service port). Thus, a single service connection may be provided by the valve and the servo valve may be a three-way valve. Alternatively, the servo valve may comprise two types of service port (first service port(s) and second service port(s)). Thus, two service connections may be provided and the servo valve may be a four-way valve. It may be that the supply of fluid via one of said service ports to the system element causes the system element to which the valve is connected to move in a first direction, while the supply of fluid via the other of said ports to the system element causes the system element to move in a second, opposite, direction.

The three pairs of ports may be the first pair of service ports, a pair of pressure ports and a pair of return ports. When the spool is rotated to the first position, a fluid flow path may be provided from the pressure ports to the service ports. It may be that when the spool is rotated to the first position the return ports may be blocked.

The spool may be arranged to rotate in a second, opposite, direction from said neutral position to a second open position in which a fluid flow path is provided between each service port and another of the remaining ports, each fluid flow path being defined at least in part by one of the indented sides.

The rotary servo valve may be further configured such that those ports that were open (i.e. connected to the service ports via the fluid flow path) in the first open position are closed in the second position. Thus, in the first open position a fluid flow path may be provided between the pressure ports and the first service ports, in the second open position a fluid flow path may be provided between the first service ports and the return ports, or vice versa. Alternatively, in the first open position a fluid flow path may be provided between the pressure ports (if present) or return ports (if present) and the first service ports and in the second position a fluid flow path may be provided between the same one of the pressure ports (if present) or return ports (if present) and the second service ports.

The fluid may be hydraulic fluid.

The rotary servo valve may be configured to be directly driven by an electric motor. A directly driven configuration may provide additional efficiency gains, compared to use of a separate amplifier pilot stage.

The rotary servo valve may be symmetrical about a centre line, such that a similar flow is provided on either side of the spool.

The housing may be a hollow cylindrical tube, with a maximum diameter of less than 50 mm.

The maximum diameter of the spool may be less than half the maximum diameter of the housing, and preferably may be less than one third the maximum diameter of the housing.

The housing may be formed using additive manufacturing. Manufacturing using additive manufacturing techniques may facilitate the provision of a housing portion having the ports required by the present invention as it allows more flexibility in terms of the layout of the flow galleries within and leading to the housing as compared with traditional (subtractive) commercial manufacturing techniques which may be limited to, for example, straight bores.

The housing may be a metal housing, for example a steel housing. The housing may be mounted in and/or form part of a manifold.

The metering element may further comprise a flow divider positioned inside each service port.

The flow divider may comprise a body located immediately upstream of the service ports, for example within the housing, spaced apart from the port formed in the surface defining the cavity, and arranged such that in use fluid flows on either side of the divider before passing through the port. The flow divider may comprise a curved protrusion which extends into the port from the port inner side wall (i.e. the portion of the housing defining the port). The flow divider may function to split the fluid flow, thereby reducing the flow area and increasing the fluid speed (providing a consequent reduction in pressure) adjacent the fluid control surface. Such a feature may therefore act to reduce the magnitude of the loads acting on the spool.

The spool may comprise one or more through conduits extending from one indented side to the opposite indented side. The conduits may be arrange to provide a flow path between the two indented sides. Such a feature may facilitate equalisation of local pressures across the spool.

The rotary servo valve may be configured to provide three-way control. That is, to connect pressure and return (via the pressure ports and return ports respectively) with a single service (via a first set of service ports). In the case of three-way valves it may be advantageous to provide more than one set (or layer) of ports in the housing and a corresponding spool portion in order to increase the flow rate through a valve of a given size.

The rotary servo valve may be configured to provide four-way control. That is, to connect pressure and return (via the pressure ports and return ports respectively) with a first and second service (via the first and second service ports respectively). The first and second service may be either side of an actuator (or system element). The provision of more than one set (or layer) of ports and a corresponding spool portion may facilitate the provision of four way control in valves in accordance with the present invention.

The rotary servo valve may further comprise a housing portion defining a cylindrical cavity and a second layer of ports, the second layer having three pairs of ports including a first pair of service ports, the ports of each pair arranged so as to be diametrically opposed about the cylindrical cavity; and a second spool portion comprising two opposing indented sides and two opposing sides having an increased radius relative to the indented sides, each side of increased radius extending between the two indented sides, and wherein the second spool portion is mounted for rotation relative to the cylindrical cavity, from a neutral position in which each side of increased radius of the second spool portion blocks at least one port of the second layer so as to prevent fluid flow through the valve, to an open position (a first open position) in which a fluid flow path is provided between each service port of the second pair of the second layer and a corresponding one of the remaining ports, each fluid flow path being defined at least in part by one of the indented sides of the second portion.

The second pool portion may be arranged to rotate in a second, opposite, direction from said neutral position to a second open position in which a fluid flow path is provided between each service port and another of the remaining ports, each fluid flow path being defined at least in part by one of the indented sides In the case that the three pairs of ports in the first layer are the first pair of service ports (e.g. being first service ports), a second pair of service ports (e.g. being second service ports) and either one pair of pressure ports or one pair of return ports, the three pairs of ports in the second layer may be the first pair of service ports (e.g. being first service ports), the second pair of service ports (e.g. being second service ports) and the other one of a pair of pressure ports or a pair of return ports. Thus, when the spool portions of the first and second layer are in the first open position, fluid may flow in the first layer between the pressure ports and the first pair of service ports, and in the second layer between the second pair of service ports and the return ports. Similarly, when the spool portions of the first and second layer are in the second open position, fluid may flow in the first layer between the pressure parts and the second pair of service ports and in the second layer between the return ports and the first pair of service ports.

In the case that the three pairs of ports in the first layer are the first pair of service ports, a pair of pressure ports and a pair of return ports, the three pairs of ports in the second layer are a second pair of service ports, a pair of pressure ports and a pair of return ports. Thus, when the spool portions of the first and second layer are in the first open position, fluid may flow in the first layer between the pressure ports and the first pair of service ports, and in the second layer between the second pair of service ports and the return ports. Similarly, when the spools portions of the first and second layer are in the second open position, fluid may flow in the first layer between the first pair of service ports and the return ports, and in the second layer between the pressure ports and the second pair of service ports.

The servo valve may comprise further layers and further spool portions. For example, the servo valve may comprise four layers and four corresponding spool portions.

The service ports may be larger than the pressure and/or return ports. The surface area of the service ports (at the opening of said port into the cavity) may be twice the surface area of the pressure and/or return ports.

The servo valve may comprise a spool comprising the first spool portion and the second spool portion (if present) and any further spool portions (if present). The spool may be integrally formed. The servo valve may comprise a housing comprising the first housing portion, the second housing portion (if present) and any further housing portions. The housing may be integrally formed.

The ports of each layer may be radially aligned with (but axially separated) from the ports of any other layer within the housing. In operation, the rotational position of the first spool portion with respect to the housing may therefore be the same as the rotational position of the second spool portion with respect to the second housing.

In a second aspect of the invention there is provided a method of controlling fluid flow using a rotary servo valve, the servo valve comprising: a housing defining a cavity and a first layer of ports, the first layer of ports having three pairs of ports, including a first pair of service ports, the ports of each pair being arranged so as to be diametrically opposed about the cavity; and a spool portion comprising two opposing indented sides and two opposing sides having an increased radius relative to the indented sides, each side of increased radius extending between the two indented sides, and wherein the method comprising rotating the spool portion from a neutral position in which each side of increased radius blocks at least one port so as to prevent fluid flow through the valve, to an open position in which fluid flows between each of the service ports of the first pair and a corresponding port of one of the remaining pairs of ports, the fluid passing over an indented side as it flow between said ports.

The method may further comprising the step of rotating the spool portion from the neutral position to a second open position in which fluid flows between each of the service ports of the first pair and a corresponding port of one of other remaining pair of ports, the fluid passing over an indented side as it flow between said ports.

In a third aspect of the invention, there is provided a two-stage servo valve for controlling fluid flow wherein the first stage valve is a rotary valve, and the second stage valve is a linear valve mounted coaxially with the rotary valve.

Arranging the first and second stages coaxially may facilitate the production of a more compact valve for a given flow rate.

The two-stage valve of the present invention may provide a second stage flow in the region of 10-200 times larger than the first stage flow. The two-stage valve may optionally include further stages, for example a third stage.

The rotary valve of the first stage may be a valve in accordance with the first aspect of the invention as discussed above.

The fluid may be hydraulic fluid. The first stage may be coupled, for example hydraulically coupled, to the second stage, such that a rotary displacement of the first stage valve produces a corresponding linear displacement in the second stage valve.

The second stage valve may comprise a second stage spool. The second stage spool may comprise an elongate, generally cylindrical, body. The second stage valve may comprise a sleeve. The sleeve may define a cylindrical cavity and one or more layer of ports. The sleeve may be mounted in a manifold comprising a plurality of flow galleries in fluid communication with the ports. The second stage spool may be mounted concentrically within the sleeve. The second stage spool may be mounted for movement along the longitudinal axis of the sleeve.

The first stage valve may comprise a first stage spool. The spools of the first and second stage valves may be mounted coaxially. That is to say, the rotational axes of the spools of the first and second stage may be on a common axis. The first and second stage spools may be mounted concentrically. That is to say, at least a portion of the first and second stage spools may overlap such that at least a portion of the first stage spool is located within a portion of the second stage spool (or vice versa).

The first stage spool may be mounted within a housing. The housing may be mounted on or form part of a first stage manifold.

The second stage value may include a first cavity and a second cavity, each cavity being arranged such that fluid in said cavity exerts a pressure on the second stage spool such that, in use, the second stage spool moves with respect to the sleeve as a result of the pressure difference between the first and second cavities. The two-stage valve may include a sensor for providing second stage spool position feedback. Fluid in the first and/or second cavity may act (i.e. exert pressure) on a corresponding portion of the surface of the spool. The surface area of the corresponding portion of the first cavity may differ from the surface area of the corresponding portion of the second cavity. Thus, it may be that for the same pressure in each cavity a different force is applied to the second stage spool. Alternatively, the surface area of the corresponding portions of the surface of the spool of the first and second cavities may be the same. The surface area of the corresponding portion may be determined by the diameter of the spool and/or the cross-sectional area of the cavity.

One or more of the first and/or second stage: spool, housing, sleeve and/or manifold may be formed using additive manufacturing techniques. The maximum diameter of the second stage spool may be less than 100 mm. The maximum diameter of the first stage spool may be less than 50 mm. The maximum diameter of the second stage sleeve may be less than 150 mm. The maximum diameter of the first stage housing may be less than 100 mm. The minimum diameter of the second stage sleeve may be greater than 20 mm.

The first stage valve may be configured to be directly driven. The first stage valve may be coupled directly to a rotary motor. Such a feature may provide the benefit of minimising quiescent fluid leakage (i.e. power loss). The first stage valve may be bi-directional.

The second stage valve may be configured to receive a pressure source fluid flow in one of the first and second cavity. The second stage valve may be configured to receive a service fluid flow in the other of the first and second cavity. The service fluid flow may be received from the first stage valve, for example via one of more flow galleries formed in the first and/or second stage manifold. The second stage spool may comprise one or more flow galleries configured to provide fluid to the second cavity. The cross-sectional area of the cavity which receives a service flow from the first stage valve may be twice the cross-sectional area of the cavity which receives a supply pressure.

Each of the first and/or second cavity may extend into the spool from a respective distal end. The or each cavity may extend in a direction parallel to the longitudinal axis of the second stage spool.

The first stage spool may extend into the first cavity. The first stage valve and second stage valve may be mounted such that the first stage manifold and/or housing extends into the first cavity of the second stage spool. The first stage manifold and/or housing may be configured such that the first stage manifold and/or housing fits within the first cavity to seal the first cavity.

The cross-sectional area of the second cavity may differ from the cross-section area of the first cavity such that for the same pressure in each cavity a different force is applied to the second stage spool. For example, the cross-sectional area of the first cavity may be twice the cross-sectional area of the second cavity (or vice versa).

The second stage may be configured such that pressurized fluid in the first and/or second cavity acts on a respective distal end of the spool. The diameter of the spool at one distal end may be different to the diameter of the spool at the other distal end such that for a given pressure in each cavity a different force is applied to the second stage spool.

The rotary valve of the first stage may comprise a single layer of ports as discussed above with reference to the first aspect of the invention. The single layer of ports may have a pair of service ports, a pair of pressure ports and a pair of return ports. Thus, the first stage valve may be a three-way valve.

The rotary valve may comprise two, or more, layers of ports as discussed above with reference to the first aspect of the invention. Thus, the rotary valve may provide four-way control. In such a four-way configuration, each layer may include a pair of service ports, a pair of pressure ports and a pair of return ports. Alternatively, each layer may include two pairs of service ports, and one of either pressure or return (one layer having pressure ports, and the other layer having return ports).

The second stage valve may be configured to receive a first service fluid flow in the first cavity, and a second, different, service fluid flow in the second cavity. Each of the first and second service flow may be received from the first stage valve. In such a configuration, a variable pressure may be applied in the first cavity by the first service fluid flow, and a second variable pressure may be applied in the second cavity by the second, different, service fluid flow.

The present invention may provide a two-stage servo valve for controlling fluid flow comprising a first stage valve of the first aspect, and a second stage linear valve mounted coaxially with the first stage valve.

The valve may comprise a control system configured to control operation of the valve. The control system may comprise one or more magnets configured to bias the spool towards the neutral position. The control system may comprise a first magnet mounted on the spool and/or housing and a second magnet or magnetic (e.g. ferromagnetic) material located on the other of the spool and/or housing. In use, the attraction or repulsion of the magnets (depending on whether they are of the same or opposite polarity) may act to move the spool towards the neutral position. Similarly, the attraction of the magnet and the magnetic material may act to move the spool towards the neutral position.

The two-stage valve may comprise a magnetic torsion spring. The valve may be configured such that the magnetic torsion spring acts to return the spool to the neutral position. The magnetic spring may comprise a first magnet mounted on the spool and a second magnet mounted on the housing. Each magnet may have a north pole and a south pole. The valve may be configured such that when the spool is in the neutral position the poles of the first magnet are aligned with the opposite poles of the second magnet (e.g. north aligned with south). The valve may be configured such that, as the spool is moved away from the neutral position, the poles of the first magnet are moved towards the like poles (e.g. north towards north), and/or away from the opposite poles of the second magnet. Thus, the magnetic force will seek to return the spool to the neutral position. The first magnet may be in the form of a cylinder. The second magnet may be annular. The first magnet may be mounted concentrically within the second magnet.

The two-stage servo valve may further comprise an electrical transducer, configured to feedback information relating to the position of the second stage valve.

The two-stage valve may further comprise an electrical transducer configured to feedback information relating to the position of the first stage valve.

In a fourth aspect of the invention, there is provided a method of operating a two-stage servo valve comprising a first (pilot) stage valve and a second stage valve, the method comprising rotating (or causing to rotate) the spool of the first stage valve such that an axial displacement of the spool of the second stage is produced. The axial displacement of the second stage spool may result in a flow path being created or altered between the ports of the second stage, as described above.

The method may be such that the displacement of the spool of the second stage (and the subsequent creation or alteration of flow path) causes a movement in a system element (for example an actuator).

The method may comprise rotating the first stage spool using a direct drive motor.

The method may comprise rotating the first stage spool in a first direction to a first open position to cause movement of the second stage spool in a first axial direction, and then rotating the first stage spool in a second, different, direction to a second open position to cause movement of the second stage spool in a second, different axial direction.

In to a fifth aspect of the invention, there is provided a rotary servo valve comprising two layers, each layer comprising a housing portion defining a cavity and four fluid ports including two service ports; the four fluid ports providing a pair of higher-pressure ports and a pair of lower-pressure ports, the ports of each pair being located diametrically opposite each other around the cavity. The valve further comprises a spool portion having at least two indented sides, the spool being mounted for rotation relative to the housing between a neutral position in which the spool portion blocks at least one pair of ports of the layer such that fluid flow through the cavity is prevented and an open position in which a fluid flow path is provided between each higher-pressure port and a lower-pressure port via an indented side. The spool and housing portions are configured such that flow via each fluid flow path is metered by an orifice defined by the spool and the higher-pressure port.

Metering fluid flow at the higher-pressure 'edge' of the spool (i.e. at the interface between the spool and the higher-pressure port) may result in an improved pressure distribution across the face of the spool that is exposed to the fluid flow. In particular, it is believed that the increased inertia of the flow at the higher-pressure edge (in comparison with the lower pressure edge) may mean that a flow metered at the higher-pressure edge remains better attached to the spool surface and therefore may reduce the torque loads generated by pressure changes across that surface. As discussed in more detail above, it is desirable to reduce the torque loading on a servo valve spool for various reasons.

It will be appreciated that the terms 'higher-pressure' port and 'lower-pressure' port refer to the relative pressure of the fluid at the two ports on a flow path (in normal operation). In normal operation, fluid will flow from the higher-pressure port to the lower-pressure port. For example, for a flow path between a pressure port and a service port, the pressure port will be the higher-pressure port and the service port will be the lower-pressure port. For a flow path between a return port and a service port, the service port will be the higher-pressure port and the return port will be the lower-pressure port.

In the neutral position one or both of the ports on a fluid flow path may be covered by the spool. It will be appreciated that for a fluid flow path to exist between two ports, both ports must be at least partially uncovered. In the case that the uncovered area of one port is different to the uncovered area of the other port, the smaller uncovered area will limit the flow of fluid through the flow path. Thus, flow be metered at the port where the uncovered area of the port is smaller than the uncovered area of the other port. An orifice may be defined as the opening defined (at least in part) by the port and the spool. The cross-sectional area of an orifice will therefore correspond to the uncovered area of the port. An orifice associated with a port may be said to meter the flow of fluid through the flow path between that port and another port if the orifice has a smaller cross-sectional area than the orifice of the other port. The term higher-pressure orifice may be used to refer to an orifice defined at least in part by the spool and the higher-pressure port. The term lower-pressure orifice may be used to refer to an orifice defined at least in part by the spool and the lower-pressure port.

The orifice may be defined at least in part by the outer surface of the spool.

The spool and housing portion may be configured such that, when the spool is in the open position, the component of flow parallel to the indented surface of the spool is greater in the region adjacent the higher-pressure orifice than the region adjacent the lower-pressure orifice. That is to say, the valve may be configured such that fluid flows in into the spool void (the volume defined between an indented side of the spool and the housing portion) along the surface of the intended side, but flows out of the spool void in a direction angled away from the indented side.

The valve many be configured so that when the spool is in the neutral position each higher-pressure port is covered by the spool. The valve many be configured so that when the spool is in the neutral position each lower-pressure port is (at least partially) uncovered by the spool. The ports may be located around the circumference of the cavity such that, when the spool is in the open position, a larger area of the lower-pressure port is uncovered as compared to the higher-pressure port. Thus, the lower-pressure orifice may have a larger cross-sectional area than the higher-pressure orifice allowing for metering at the higher-pressure orifice.

Each port may extend along a portion of the circumference of the cavity. Thus each port may have a circumferential extent or width. The width of the higher-pressure port may be less than the width of the lower-pressure port. This may allow the cross-sectional area of the higher-pressure orifice to be smaller than the cross-sectional area of the lower-pressure orifice when the spool is in the open position. It will be appreciated that the width of the port within the housing may vary, but that it is the width at the point at which the port opens onto the cavity (e.g. the edge of the cavity) that will be of significance for defining the orifice.

In contrast to the housing portion of the first aspect of the invention, the housing portion of the present aspect of the invention may define only two pairs of ports, or may alternatively define a minimum of two pairs of ports. Each set of two pairs of ports may be referred to as a layer. Thus, the housing portion may define a layer of ports, each layer of ports having two pairs of ports. The ports of a layer may be spaced apart along the axis of the spool from the ports of any other layer (if present). The two pairs of ports may be arranged around the circumference of the cavity. The two pairs of ports may be located at substantially the same axial position along the length of the spool and/or cavity.

It may be that the higher-pressure ports and lower-pressure ports of the first layer are pressure ports and service ports respectively. Thus, in the first layer, flow may be metered by an orifice defined at least in part by the pressure port and the spool. It may be that the higher-pressure ports and lower-pressure ports of the second layer are service ports and return ports respectively. Thus, in the second layer, flow may be metered by an orifice defined at least in part by the service-port and the spool. The service ports of the first layer may be spaced apart from the service ports of the second layer around the circumference of the cavity by 90 degrees.

Thus, in servo valves in accordance with the present aspect of the invention, the valve may be designed such that the location at which flow is metered depends on the relative pressure of the two ports on the flow path, and not the type of port. For example, it may be that in the first layer flow is metered at the pressure ports, while in the second layer flow is metered at the service ports.

The valve may comprise four layers, each of the second and third layers comprising a housing portion defining a cavity and four fluid ports and a spool portion as discussed above. It may be that the service ports of the first layer are first service ports. It may be that the service ports of the second layer are second service ports. It may be that the higher-pressure ports and lower-pressure ports of the third layer are pressure ports and second service ports respectively. It may be that the higher-pressure ports and lower-pressure ports of the second layer are first service ports and return ports respectively. Thus, the four layer servo valve may be a four way valve providing two service connections. The valve may comprise further sets of layers, for example sets of four layers, each set of layers comprising first service ports, second service ports, pressure ports and/or return ports as discussed above.

The spool of the present aspect may include any other feature of the spool of the first (or any other) aspect. For example, the spool portion may comprise two opposing indented sides and two opposing sides having an increased radius relative to the indented sides, each side of increased radius extending between the two indented sides, the valve being arranged such an indented side defines, at least in part, the flow path between the higher-pressure and lower-pressure ports.

Each side of increased radius may have a constant radius as discussed in more detail above.

Each indented side may be a straight side as discussed in more detail above. Each indented side may be a concave side as discussed in more detail above.

In a sixth aspect of the invention, there is provided a method of controlling flow through a rotary servo valve, the rotary servo valve comprising two layers, each layer comprising a housing portion defining a cavity and four fluid ports including two service ports; the four fluid ports providing a pair of higher-pressure ports and a pair of lower-pressure ports, the ports of each pair being located diametrically opposite each other around the cavity; and a spool portion. The method may comprise rotating the spool portion between a neutral position in which the spool portion blocks at least one pair of ports of the layer such that fluid flow through the cavity is prevented and an open position in which a fluid flow path is provided between each higher-pressure port and a lower-pressure port; and metering the flow in each layer using an orifice defined by the spool and the higher-pressure port of that layer.

It will of course be appreciated that features described in relation to one aspect of the present invention may be incorporated into other aspects of the present invention. For example, the method of the invention may incorporate any of the features described in connection with the apparatus of the invention and vice versa.

DESCRIPTION OF THE DRAWINGS

Various embodiments of the present invention will now be described by way of example only with reference to the accompanying schematic drawings of which.

DETAILED DESCRIPTION

Figure 1:
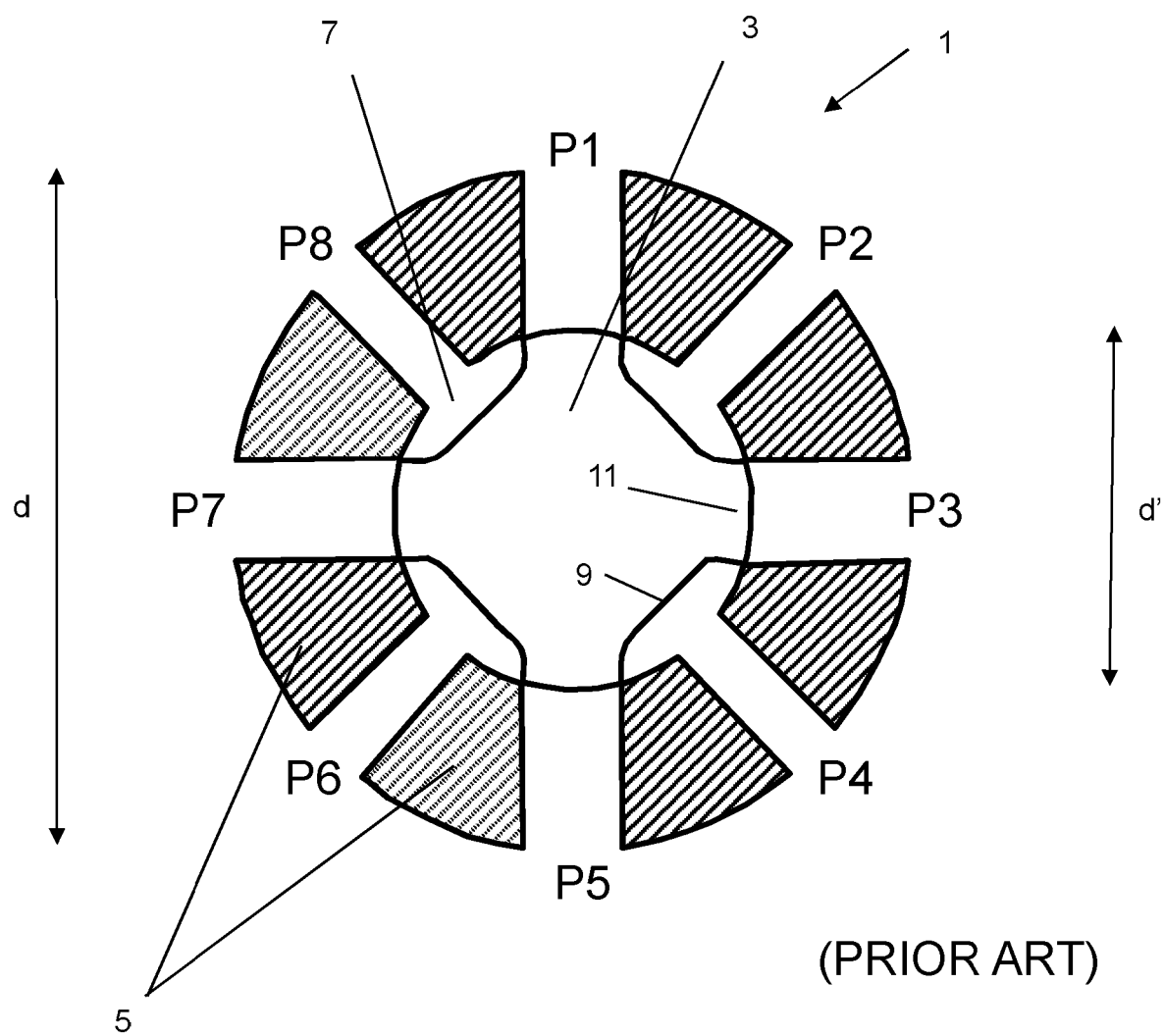
FIG. 1 is an axial sectional view of part of a prior art rotary servo valve.

FIG. 1 shows part of a prior art rotary servo valve 1, with a spool 3 rotatably mounted within a surrounding housing 5 (mountings not shown). The housing 5 is broadly cylindrical (shown in cross-section) and shaped to define a central cylindrical cavity 7, and eight ports (P1-P8) arranged around the circumference of, and opening into, the cavity 7. The ports are arranged in diametrically opposed pairs, P1 paired with P5, P2 paired with P6, P3 paired with P7 and P4 paired with P8, so that pressures are equalized across the spool 3.

The spool 3 is sized to be a close fit within the cylindrical cavity 7 such that there is no significant flow of fluid around the sides of the spool. The spool 3 is also broadly cylindrical, with four depressed sides 9 and four protruding arms 11 spaced equidistantly around the circumference of the spool 3. The spool 3 has fourth order rotational symmetry. As the spool 3 rotates within the cavity 7, the arms 11 move to open and close (cover and uncover) in turn the ports P1, P3, P5, P7. In the Figure, the spool 3 is shown in a neutral position, in which the ports P1, P3, P5 and P7 are blocked by the arms 11 of the spool 3. In that neutral position, there is no fluid flow path provided between the ports. The spool 3 may move clockwise, or anticlockwise, as is typical for a rotary servo valve, to expose different flow paths within the valve. If the spool 3 is moved for example a few degrees clockwise, a flow path is opened between ports P8 and P1, P2 and P3, P4 and P5 and P6 and P7. If the spool 3 is moved for example a few degrees anti-clockwise, a flow path is opened between ports P1 and P2, P3 and P4, P5 and P6, and P7 and P8. Ports P1, P3, P5 and P7 may be referred to as control ports as it is the degree to which these ports are opened which controls the flow along each flow path.

In operation, a command signal corresponding to a desired spool position is applied to displace the spool. A suitable flow path from pressure to return is provided, thus producing a flow of fluid to an actuator/motor which is pressurised according to the input signal. A closed loop feedback system may be employed, to feedback information relating to the spool position to a controller which varies the input signal accordingly, to minimise any error.

Rotary servo valves such as the one shown are typically produced using traditional subtractive manufacturing techniques which may limit their size, it being difficult to produce very small valves in this way.

Figure 2:
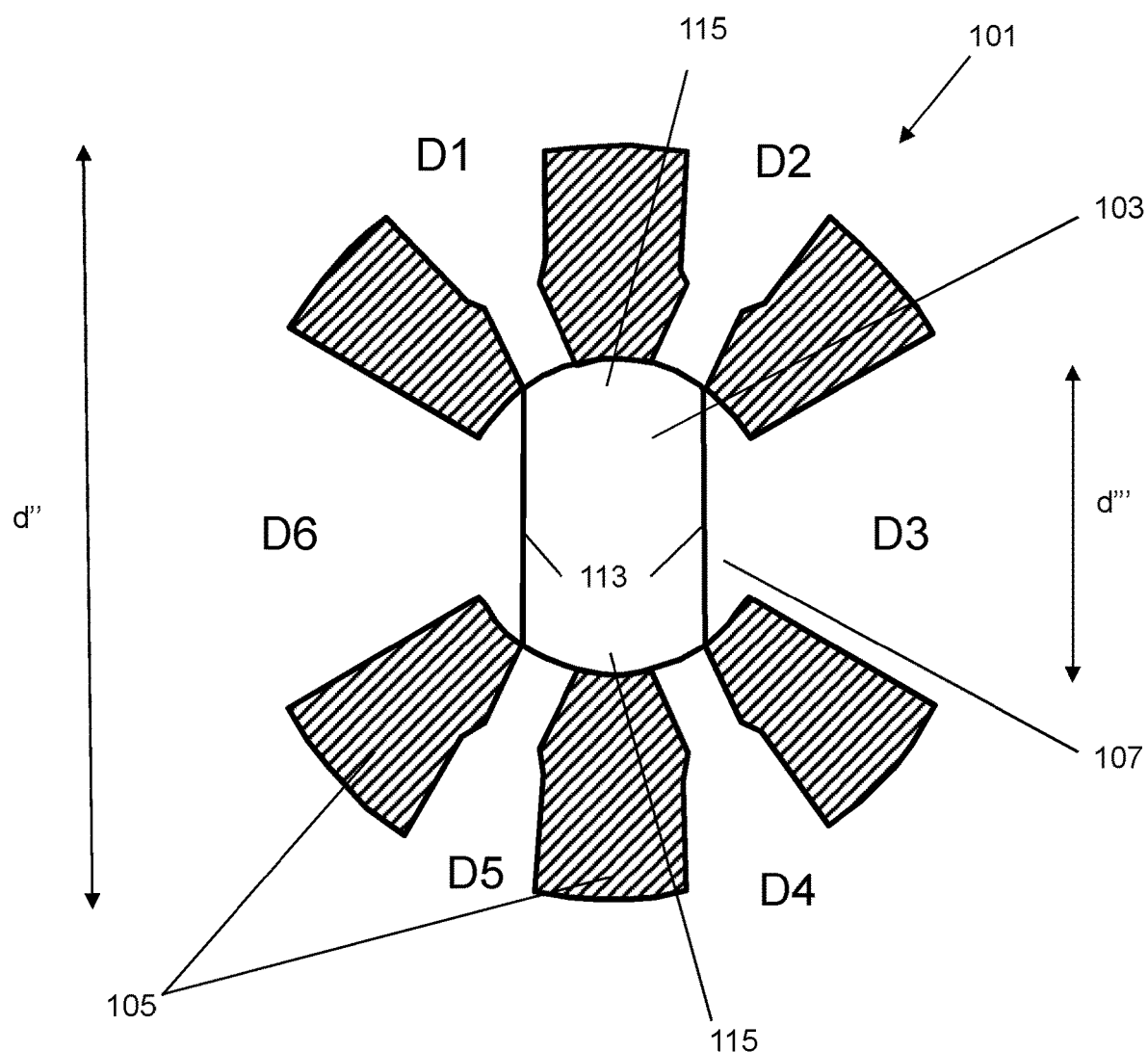
FIG. 2 is an axial sectional view of a layer of a rotary servo valve, according to a first example embodiment of the invention.

FIG. 2 shows a layer 101 of a rotary servo valve in accordance with a first example embodiment of the invention. The valve is directly driven by an electric motor (not shown). The layer 101 has a spool 103 rotatably mounted within a surrounding housing 105 (mountings not shown). The housing 105 is broadly cylindrical (shown in cross-section) and shaped to define a central cylindrical cavity 107. In contrast to the housing 5 of the prior art, the housing 105 of the present embodiment defines six ports (D1-D6) opening into the cavity 107. The ports are positioned around the circumference of the cavity 107 in diametrically opposed pairs (D1 with D4, D2 with D5, and D3 with D6).

In contrast to the metering element 1 of the prior art, the components have been manufactured using additive manufacturing.

In contrast to the metering element 1 of the prior art, the spool 103 has second order rotational symmetry. The spool 103 is cylindrical; however, it has a portion of its length along which two parallel facets 113 have been formed on opposing sides of the spool 103 defining two indented portions. The facets can be cut using a cutting wheel, or other technique known in the art. In the first example embodiment the facets 113 are planar, however in an alternative embodiment they could be slightly concave. The facets 113 are joined by two sides of increased radius 115 (i.e. the remainder of the notional cylinder of the spool). The spool 103 is depicted in FIG. 2 in a neutral position in which ports D1, D2, D4 and D5 are blocked by the protruding sides 115. In that neutral position, no fluid flow path through the metering element is provided.

Figure 3:
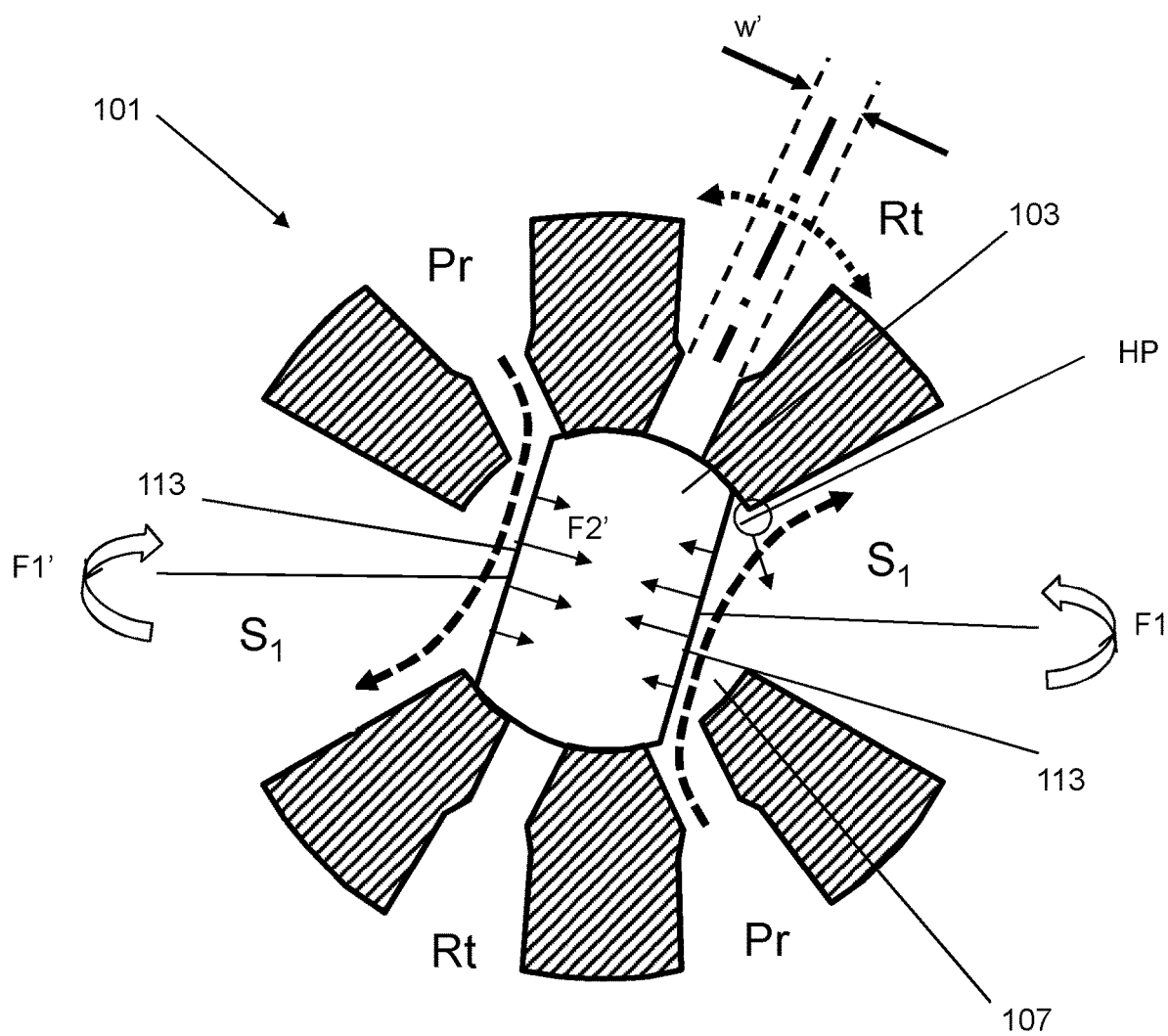
FIG. 3 is an axial sectional view of the layer of the first example embodiment of the invention, showing a fluid flow path.

FIG. 3 shows the layer 101 of the first example embodiment of the invention having a service connection 'S$_1$' to ports D3 and D6, a pressure connection 'Pr' to D1 and D4, and a return connection 'Rt' to D2 and D5. Rotation of the spool 103 clockwise to the position shown in FIG. 3 therefore provides a flow path between the service ports (D3, D6) and pressure ports (D1, D4), whilst rotation of the spool 103 in an anticlockwise direction provides a flow path between the service ports (D3, D6) and the return ports (D2, D5). In this configuration, the metering element may provide three way control. The flow of hydraulic fluid through the flow paths is illustrated by dashed lines in FIG. 3. This flow creates surface pressures on the spool 103 along the facets 113, which are reacted by a torque on the spool 103 shaft.

In use, the hydraulic fluid exerts static pressure forces (F1 and F1') on the spool, which can be resolved in axial and radial components. The axial components tend to be negligible. Since the fluid pressures are matched across the diametrically opposed pairs, the radial components generated on either side of the spool 103 are substantially equal and opposite, and the net radial force is close to zero (i.e. balanced).

In addition to forces arising from static pressures, Bernoulli forces (F2, F2') act on the spool as a result of the variation in the velocity of the hydraulic fluid as it passes across the faces of the spool on its way through the metering element. In contrast to the prior art, the arrangement of ports in valves in accordance with the present invention means that flow flows over the two indented facets 113 in opposite directions, and accordingly the resulting torque on the spools will balance each other. Aside from this balancing, the magnitude of the reaction torque is reduced since the forces act on a surface which is closer to the central axis of the spool.

Figure 4:
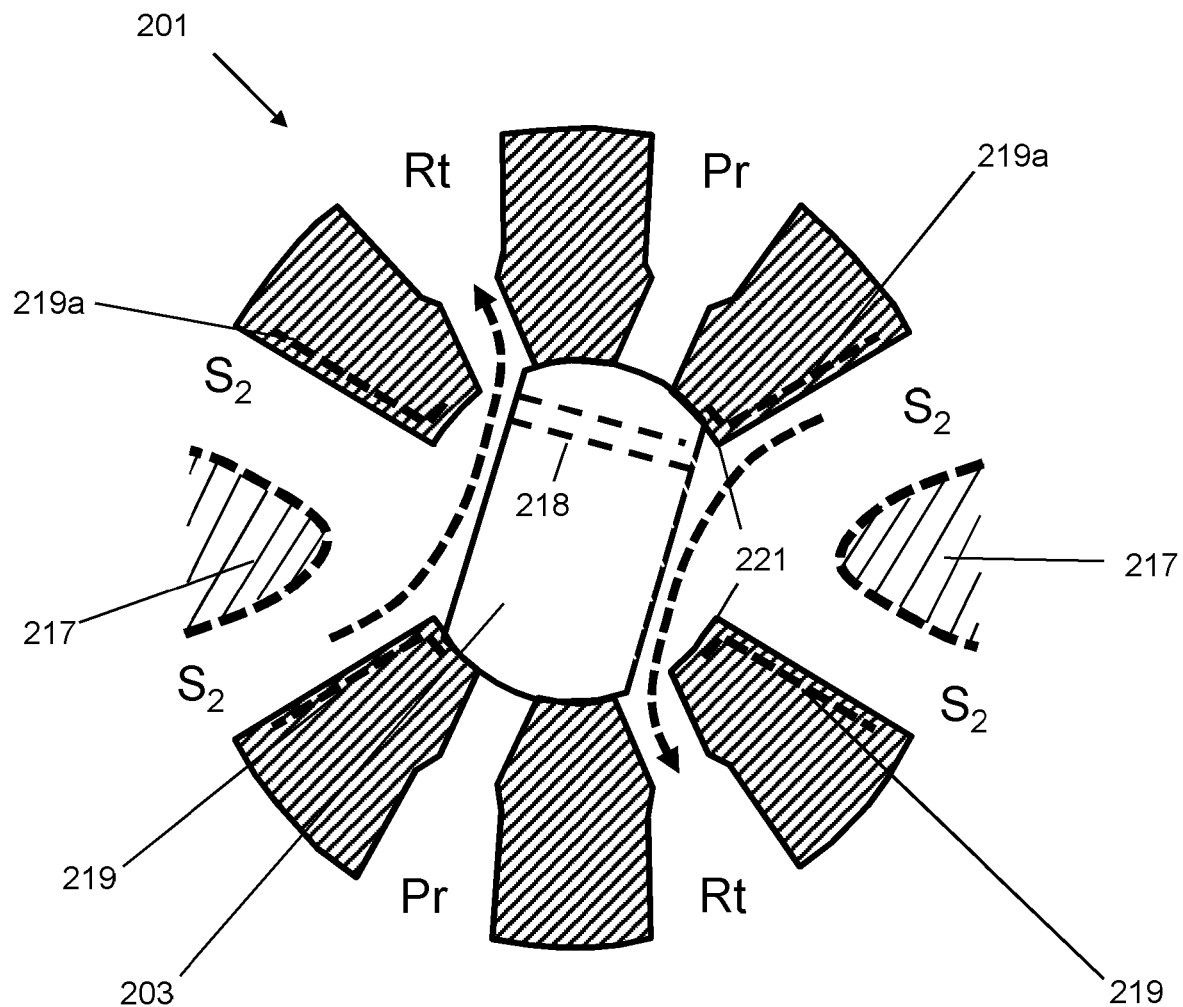
FIG. 4 is an axial sectional view of a metering element of a rotary servo valve according to a second example embodiment of the invention.

FIG. 4 shows a layer 201 in accordance with a second embodiment in which the pressure and return connections have been swapped, causing the flow direction to be reversed for the same spool rotation. Several optional features are illustrated (which equally apply to the first embodiment). A flow divider 217 may be positioned in each service port S, to further direct and control the flow. In addition, the spool may be provided with conduits 218 across the spool 203 which allow fluid to flow from one indented face 213 to the other to equalise local pressures.

Figure 5:
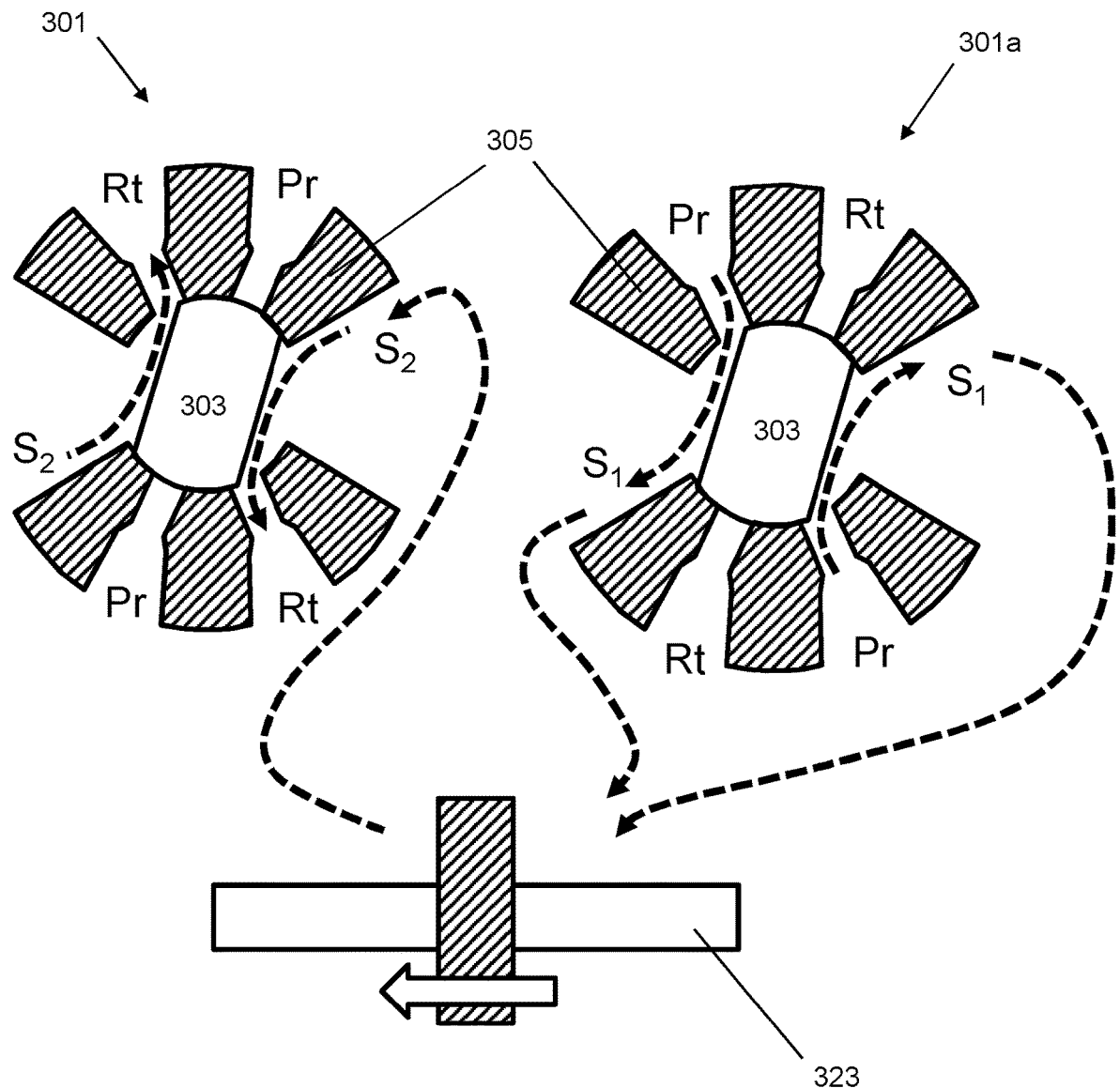
FIG. 5 is an axial sectional view of a first and a second layer of a rotary servo valve according to a third example embodiment of the invention, showing a fluid flow path to and from a piston.

FIG. 5 shows a schematic view of a third embodiment in which two layers 301, 301a are provided. Although depicted adjacent one another in FIG. 5 it will be appreciated that the metering elements 301, 301a share a common spool 303 and common housing 305. Such a double layer configuration may be used to provide four way control when operating a piston 323 with the two services $S_1$, $S_2$ arranged to provide fluid to either side of the piston 323. The Figure illustrates a configuration in which the spool is rotated clockwise from the neutral position. The fluid flow (indicated in dashed lines) passes from a pressure source Pr, through the first service S1 to one side of the piston 323 to move the piston 323 to the left. Fluid from the other side of the piston 323 flows via the second service S2 to the return Rt. To move the piston to the right, the spool must be rotated anticlockwise, to reverse the flow direction.

Figure 6:
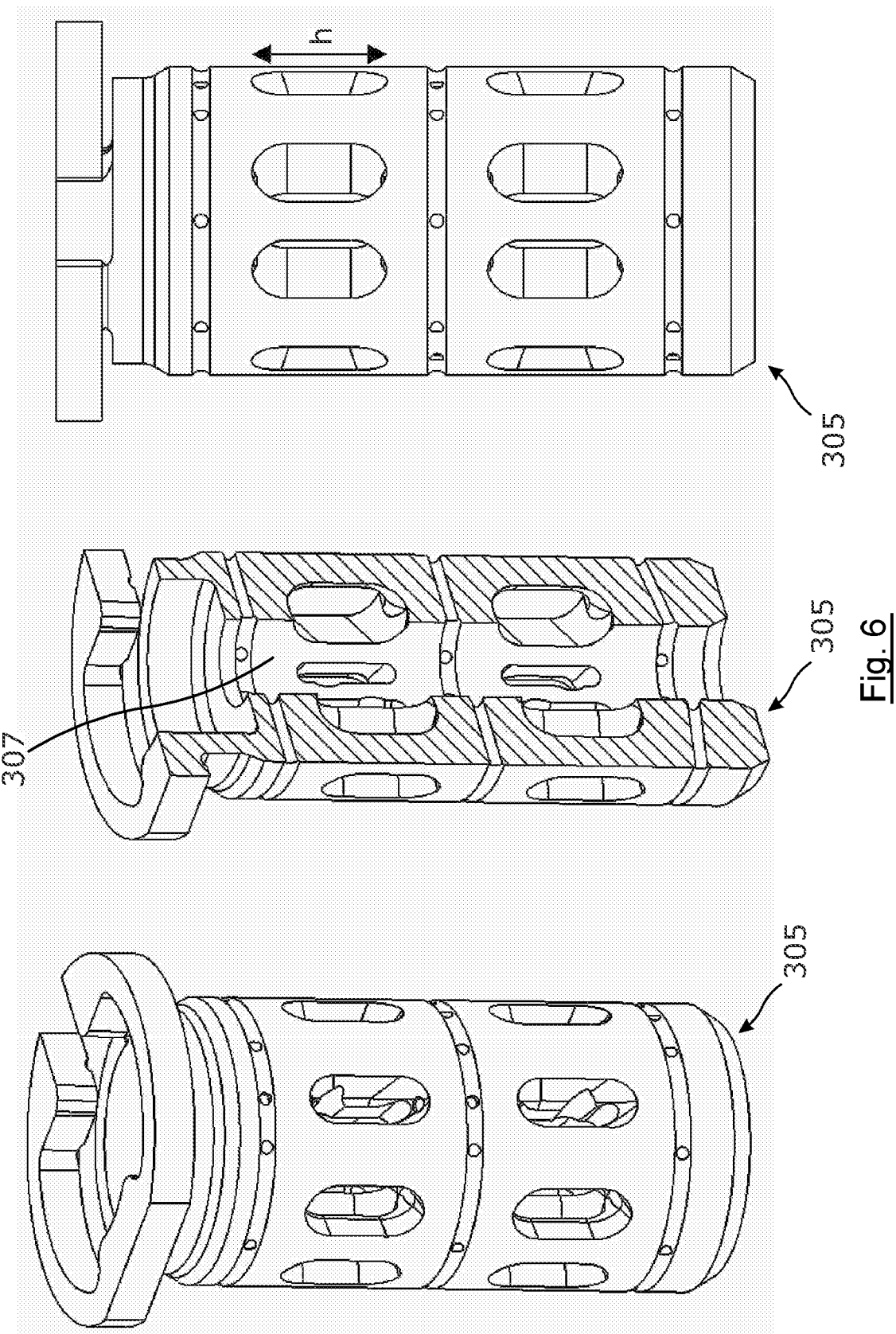
FIG. 6 is a perspective view of the housing of the rotary servo valve of the third example embodiment.

FIG. 6 shows the housing 305 of the third example embodiment of the invention. The housing 305 surrounds a cylindrical cavity 307, and has ports in the form of bores into the cylindrical cavity 307 in two axially separated layers. The ports in FIG. 6 each have the same height h. In other embodiments (not shown) the ports in different layers may have different heights.

Figure 7:
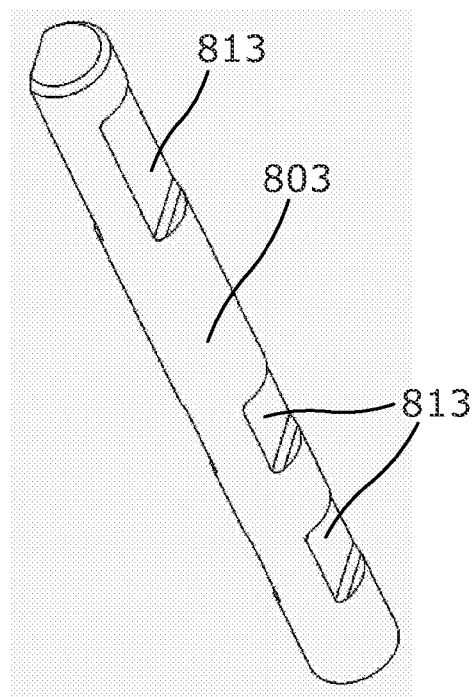
FIG. 7 is a perspective view of a spool for use in embodiments of the invention.

FIG. 7 shows a spool 803 for use with embodiments of the invention. The spool 803 is cylindrical; however, it has three segments (axially separated to correspond with the axial spacing of the layers of port in the housing) in which two parallel facets 813 have been cut on opposing sides of the spool.

Figure 8:
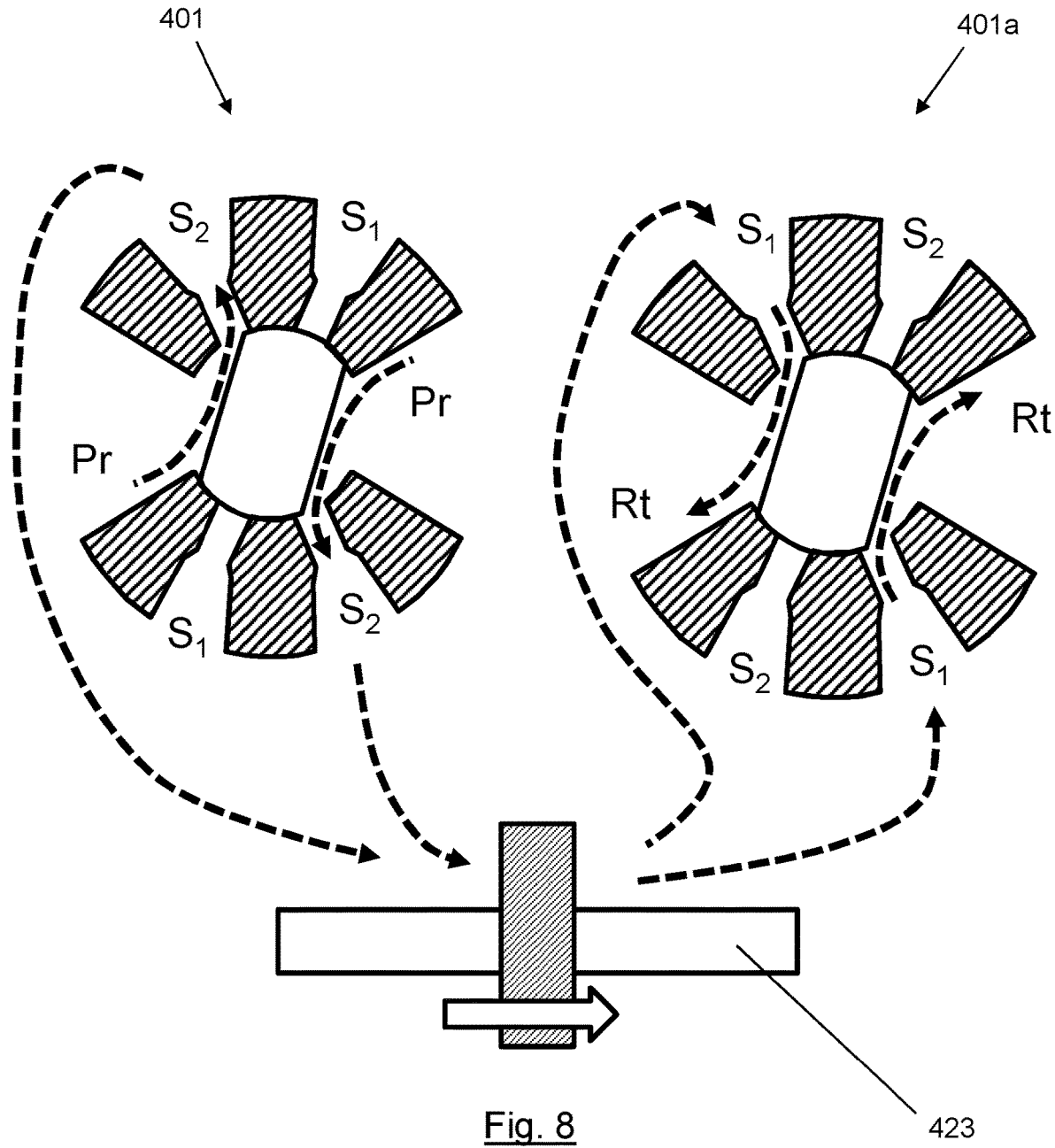
FIG. 8 is an axial sectional view of a first and a second layer of a rotary servo valve of a fourth example embodiment of the invention.

FIG. 8 shows a fourth embodiment in which two metering elements 401, 401a are mounted in series and used to control a piston 423, however the ports are connected differently compared to the configuration of FIG. 5. The configuration has pressure and return connected to the larger ports (D3, D6) and first and second service connections $S_1$ and $S_2$ on the smaller ports (D1, D2, D4 and D5).

Figure 9:
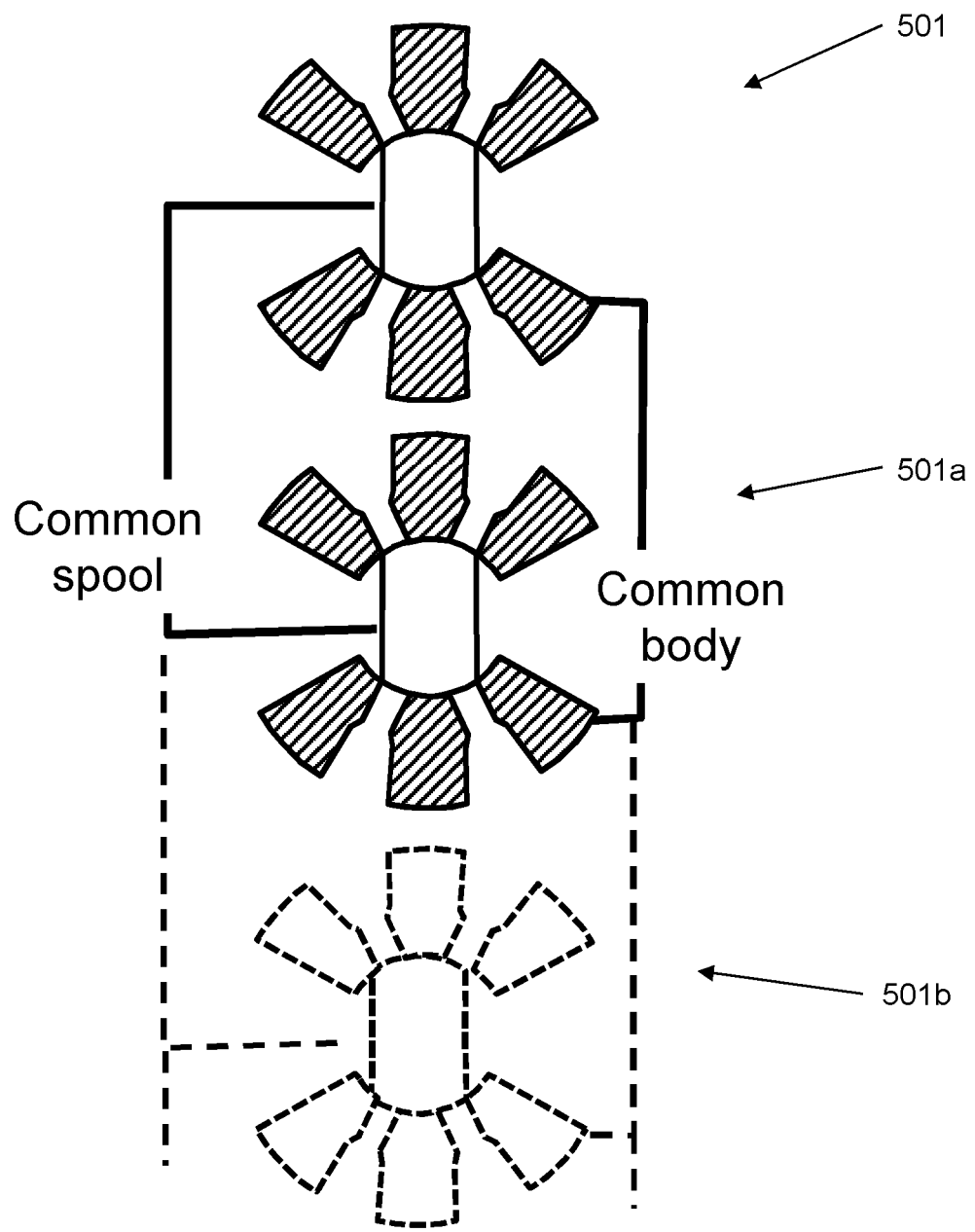
FIG. 9 is an axial sectional view of three layers of a rotary servo valve in a fifth example embodiment of the invention.

FIG. 9 shows a fifth embodiment in which three metering elements 501, 501a and 501b are mounted in series, the metering elements having a common spool and common housing. Still further metering elements having the common spool and common housing may be added in series, if desired.

Figure 10:
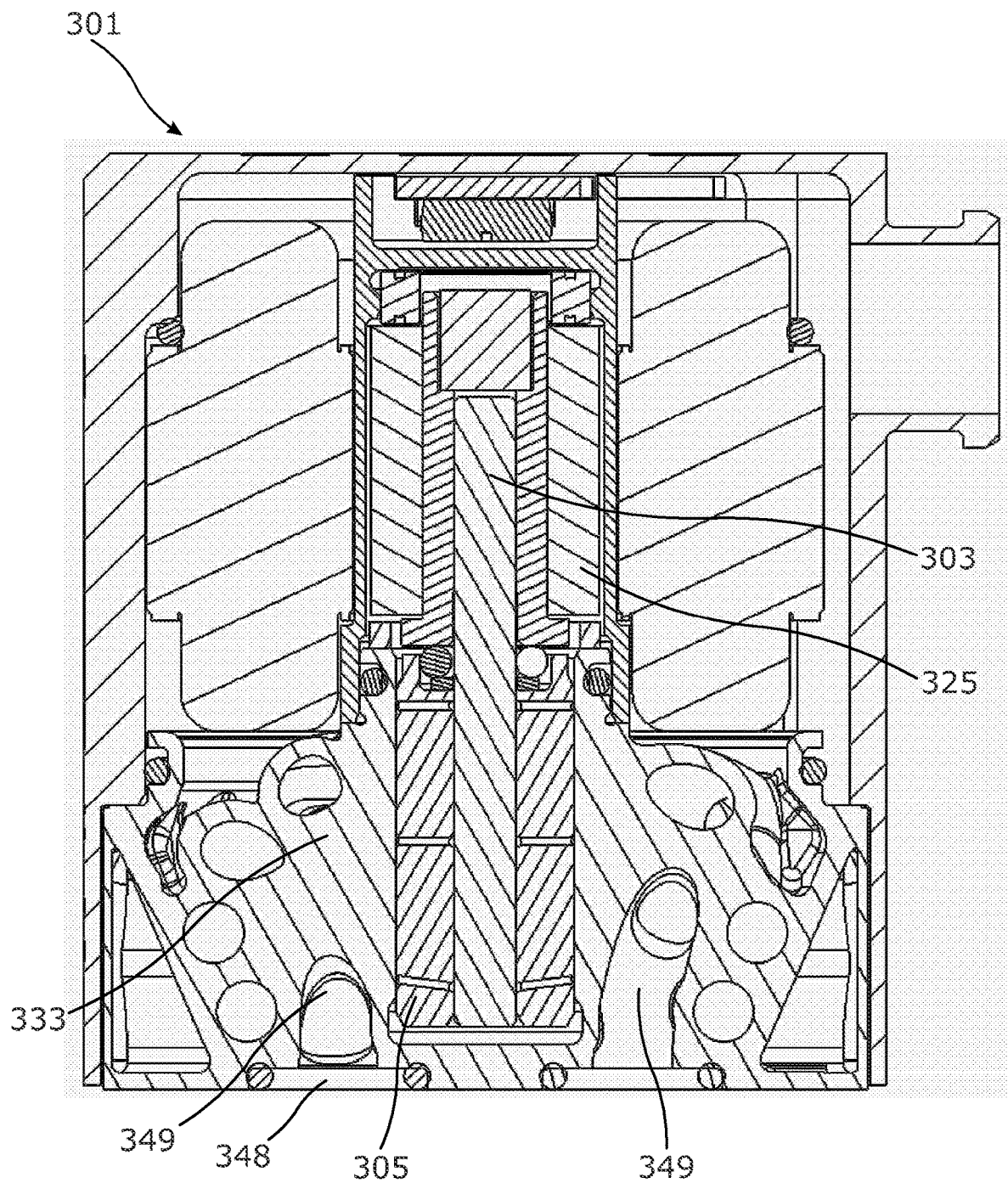
FIG. 10 is a cross-sectional side view of a rotary servo including layers in accordance with the third embodiment.

FIG. 10 shows a cross sectional view of a rotary servo valve 301 of the third example embodiment of the invention. Housing 305 is located within a manifold 333 which includes various fluid flow galleries 349 which link the cylindrical cavity 307 and the ports (D1-D6) to external ports 348 on the outside of the manifold 332. In use the external ports 348 are connect to a pressurised supply, a return or the service ports of an element (for example a piston) to be controlled by the valve. The spool 303 extends upwards through the housing 305 and through a motor 325 which in use, moves the spool 303 to control the flow of fluid through the valve. The manifold 333 may be produced from metal using additive manufacturing techniques.

A rotary servo valve as described above may be used as a pilot stage to drive a higher flow linear second stage. The electrical power source of a servo valve is typically small, for example no greater than 50V and 10 A. When there is a requirement for a high bandwidth, high powered servo valve, a small electrically powered valve can be used to control the movement of a second larger valve which in turn controls the main fluid flow. The flow provided by the second stage is typically 10-200 times larger than the flow provided by the first stage.

Figure 11:
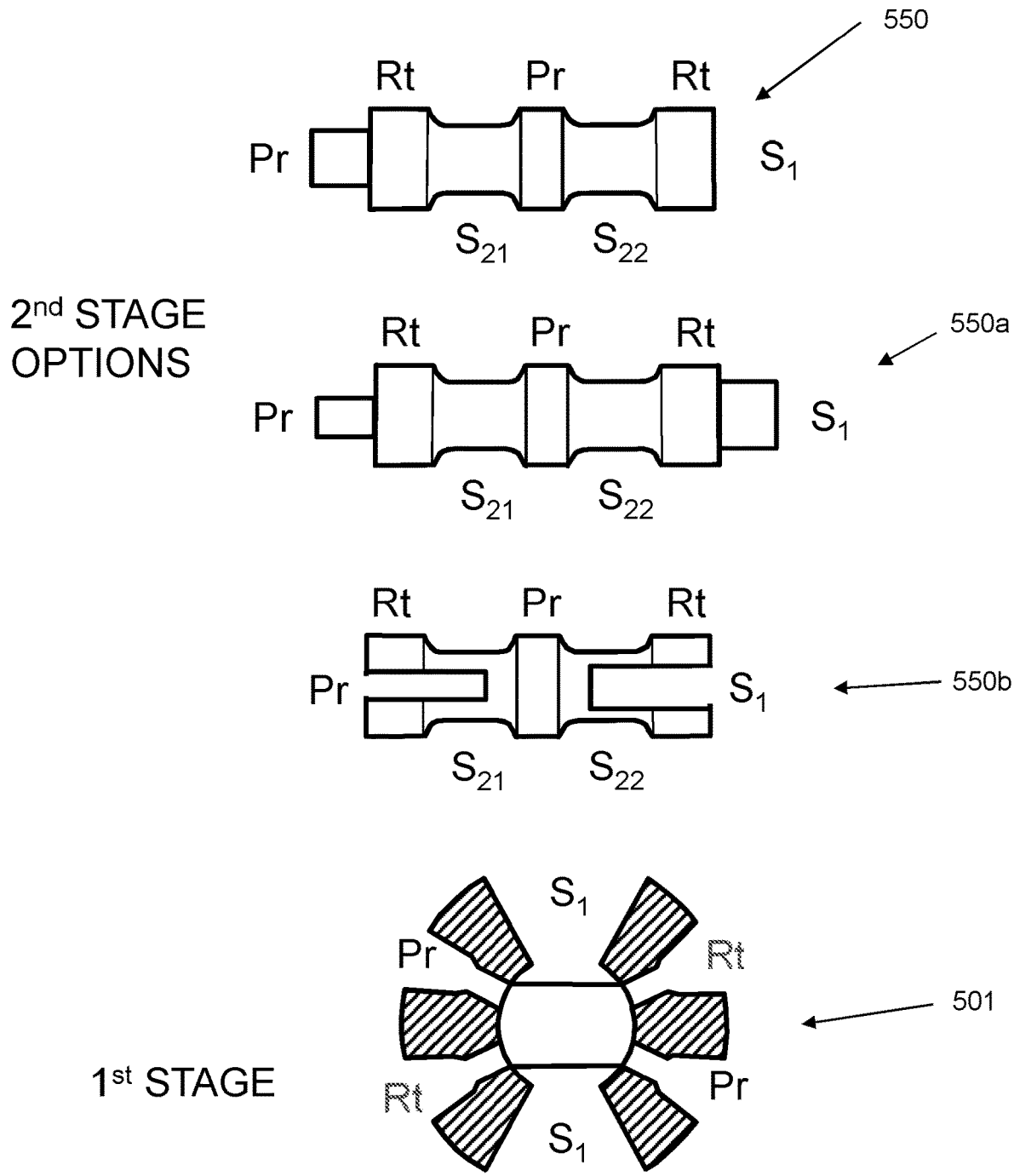
FIG. 11 is a schematic view of the first and second stages of a two-stage value according to a sixth example embodiment of the invention.

FIG. 11 shows a sixth example embodiment which uses a directly-driven single metering rotary servo valve 501 of the kind described in the first example embodiment of the invention, and three options for a second stage linear valve comprising a spool (550, 550a and 550b). In each of the three options a supply pressure is provided to one end of the second stage spool (shown on the left in FIG. 11) and a service supply from the first stage 501 is provided to the other end of the second stage spool (shown on the right in FIG. 11). In the first option, the supply pressure acts on an end of spool 550 having a reduced diameter and service pressure on the full end diameter, the area ratio being approximately 1:2. In the second option, the supply pressure acts on the end of spool 550a having a reduced diameter of spool and the service pressure acts on the other end of spool 550b which has a larger (but not full in comparison to the main body of the spool) diameter, the area ratio being approximately 1:2. In the third option, an axially extending cavity is formed in each end of the spool 550b. The supply and service pressure acting on the bottom of that cavity at the relevant end. In the spool 550b, the cavity acted on by the supply pressure has a smaller diameter than the cavity acted on by the service pressure, the area ratio being approximately 1:2.

Figure 16:
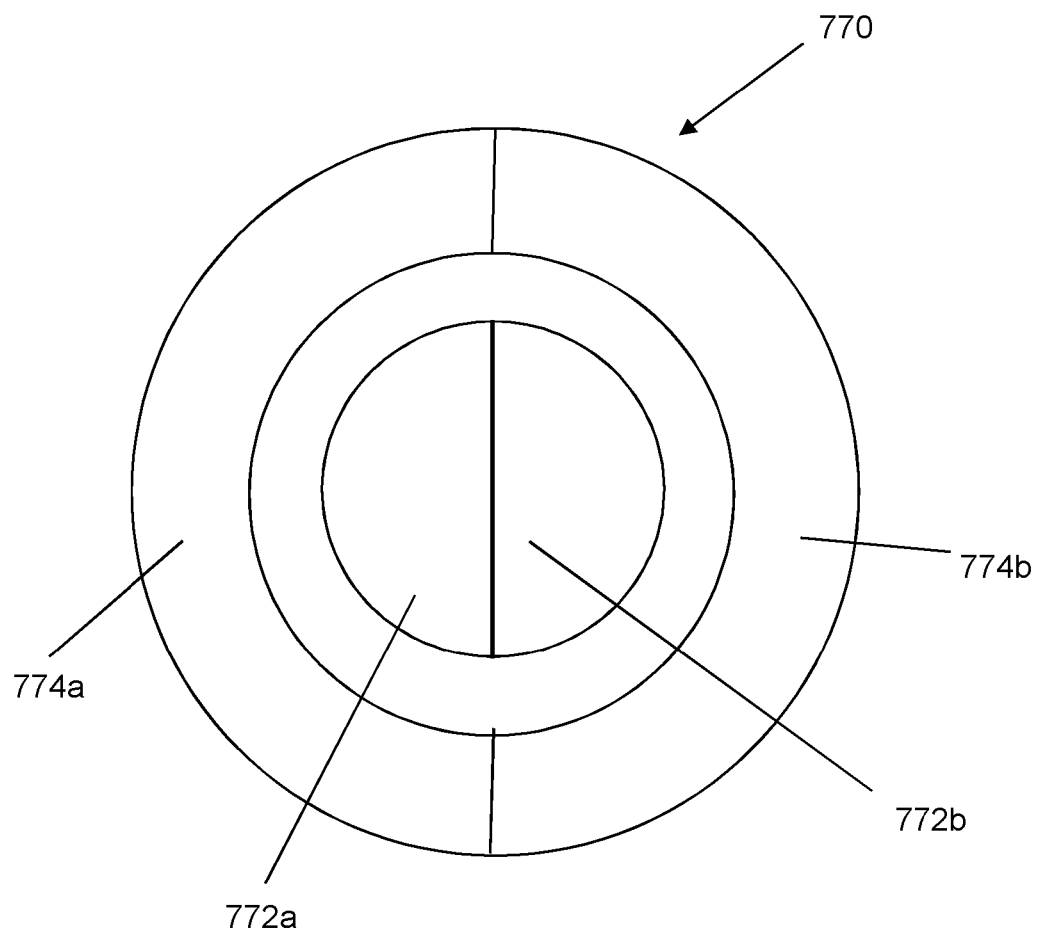
FIG. 16 shows a magnetic torsion spring for use in example embodiments.

In the example embodiment, the first stage 501 is mounted co-axially with the second stage (550, 550a, 550b). Control is provided by rotary feedback of the first stage and linear feedback from the second stage. Feedback may be provided by mechanical or electrical means. In some embodiments, a magnetic spring may be used to provide rotary feedback. FIG. 16 shows a schematic example of a magnetic torsion spring 770. The spring comprises a cylindrical magnet 772 co-axially mounted on the spool (not shown in FIG. 16) concentrically located within an annular magnet 774. As shown in FIG. 16, the left-hand half 772a of cylindrical magnet 772 is a south pole and the right-hand half 772b is a north pole while the left-hand half 774a of annular magnet 774 is a north pole and the right-hand half 774b is a south pole. The spring is shown with the spool in its neutral position in FIG. 16. As the spool, and consequently cylindrical magnet 772 rotates away from the neutral position, poles of like polarity (e.g. 772a and 774b) are brought closer together. Accordingly, the repulsion between said like poles acts against the rotation, producing a force which acts to return the magnet 772, and consequently the spool to which it is connected, to the neutral position. While such a magnetic control system may be less precise than other mechanical control systems, there may be applications where the mechanical simplicity provided by using a torsional magnetic spring as a control system is desirable.

Figure 12:
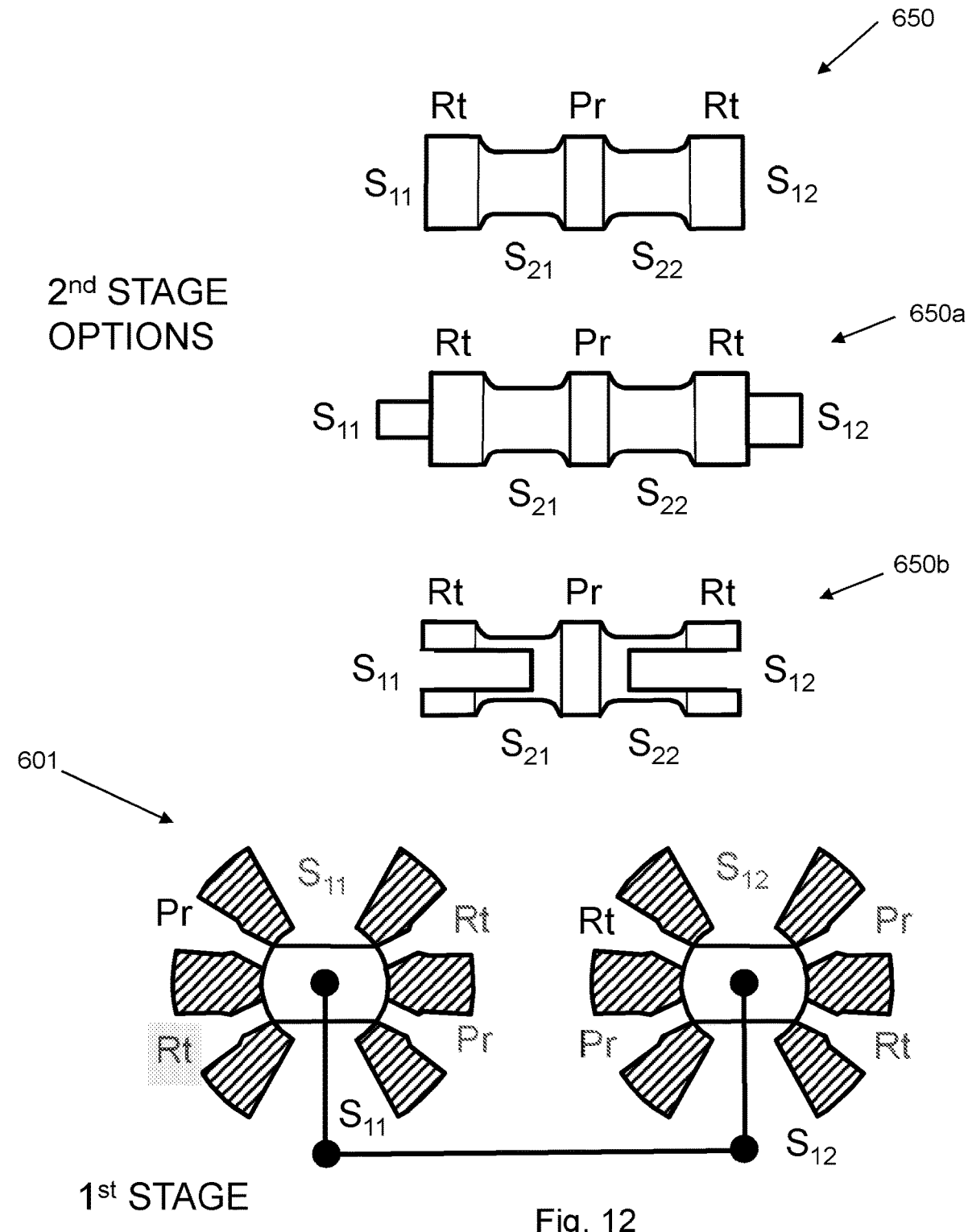
FIG. 12 is a schematic view of the first and second stages of a two-stage value according to a seventh example embodiment of the invention.

FIG. 12 shows a schematic view of seventh example embodiment comprising a servo valve having a first stage comprised of a directly-driven rotary servo valve 601 of the kind described in the third example embodiment which is capable of providing four way control. The second stage comprises a spool 650, with a first service supply $S_{11}$ provided from the first stage valve to one end of the spool 650, and a second service supply $S_{12}$ provided from the first stage valve to the other end of the spool 650. Again, three options are shown for the second stage spool (650, 650a and 650b). In the first option 650 the diameter of the second stage spool 650 is equal at both ends, and therefore $S_{11}$ and $S_{12}$ act on the same sized surface area. In the second option 650a the diameter of the spool differs at the two ends, such that $S_{11}$ and $S_{12}$ act on different sized surfaced areas of the spool, the area ratio being approximately 1:2. In the third option, a cavity is formed in each end of the spool 650b, the internal diameter of the two cavities being similar, such that $S_{11}$ and $S_{12}$ act on similarly sized internal surface areas of the spool.

In the example embodiment, the first stage 601 is mounted co-axially with the second stage (650, 650a, 650b) (the two metering elements of the first stage also being mounted co-axially). Control is provided by rotary feedback from the first stage 601 and linear feedback from the second stage (650, 650a, 650b).

Figure 13:
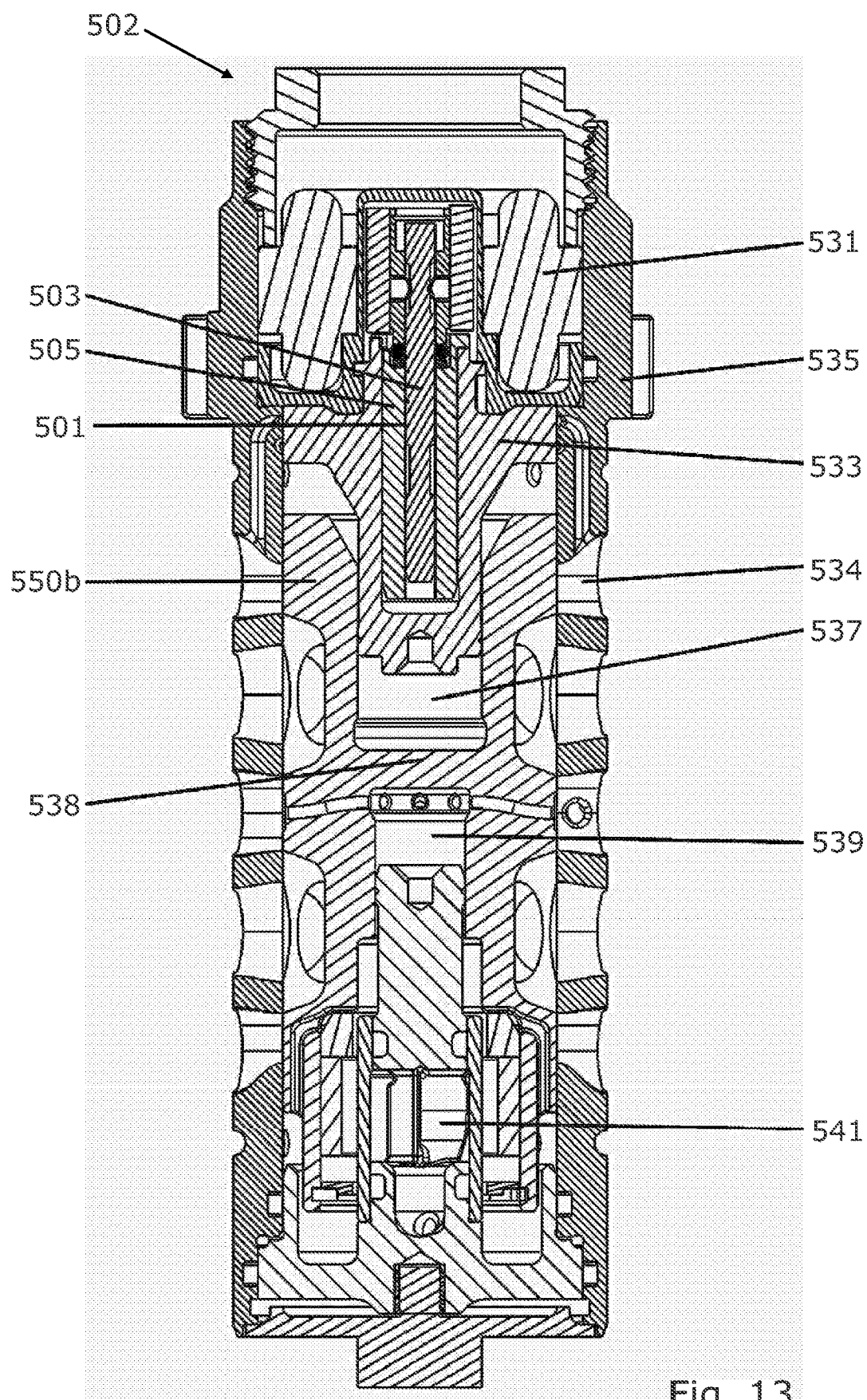
FIG. 13 is a cross-sectional side view of part of the two-stage value of the sixth embodiment.

FIG. 13 shows a close up view of a portion of a valve similar to the valve of FIG. 11 under the third option (i.e. with supply pressure acting on a reduced internal diameter of the second stage spool, and service on a larger internal diameter). The three-way first stage 501 is shown, coupled to a rotary brushless motor 531. The first stage valve 501 comprises a first stage spool 503 within a housing 505. The first stage spool 503 and housing 505 are together mounted within a first stage manifold 533 which contains flow galleries which provide fluid connections to the various ports of the first stage. In another embodiment, the housing may be integrally formed with the manifold (i.e. there may be no separate housing).

The first stage 501 is mounted co-axially with a second stage comprising a cylindrical spool 550b. The second stage spool 550b is housed inside a sleeve 535. The sleeve is located within a second stage manifold 543 (see FIG. 14) comprising a plurality of flow galleries 534 that provide fluid connections to the ports in sleeve 535. Adjacent the sleeve the galleries 534 are provided in five layers, each layer having eight rectangular galleries spaced around the circumference of the sleeve 535.

The second stage spool 550b is mounted concentrically within the sleeve 535. The second stage spool 550b includes two cavities (537, 539) one of said cavities extending inwards from each end of the spool 550b, the two cavities being located either side of a central bridging portion 538. The cavity 537 closest to the first stage valve 501 has a cross-sectional area approximately twice the cross-sectional area of the other cavity 539.

The first stage valve 501 is also mounted concentrically within the sleeve 535, a portion of the spool 503 and housing 505 of the first stage valve extending into the upper cavity 537 formed in the second stage valve spool 550b such that there is an overlap in an axial direction between the spool 503 and housing 505 of the first stage valve 501 and the second stage spool 550b.

The second stage spool 550b is mounted such that it moves linearly (i.e. in an axial direction) with respect to the first stage manifold 533. The first stage manifold 533 seals the cavity 537 closest to the first stage valve 501, providing a chamber into which pressurised fluid may flow, under the control of the first stage valve. A constant supply pressure is provided to the smaller cavity 539, whilst a variable service pressure, from the first stage valve, is applied in the larger cavity 537, and the difference in pressure between the two cavities 537, 539 causes movement of the second stage spool 500b relative to the first stage valve manifold 533, housing 505 and spool 503.

The two-stage valve 502 includes a Hall Effect sensor 541 for providing second stage spool position feedback.

Figure 14:
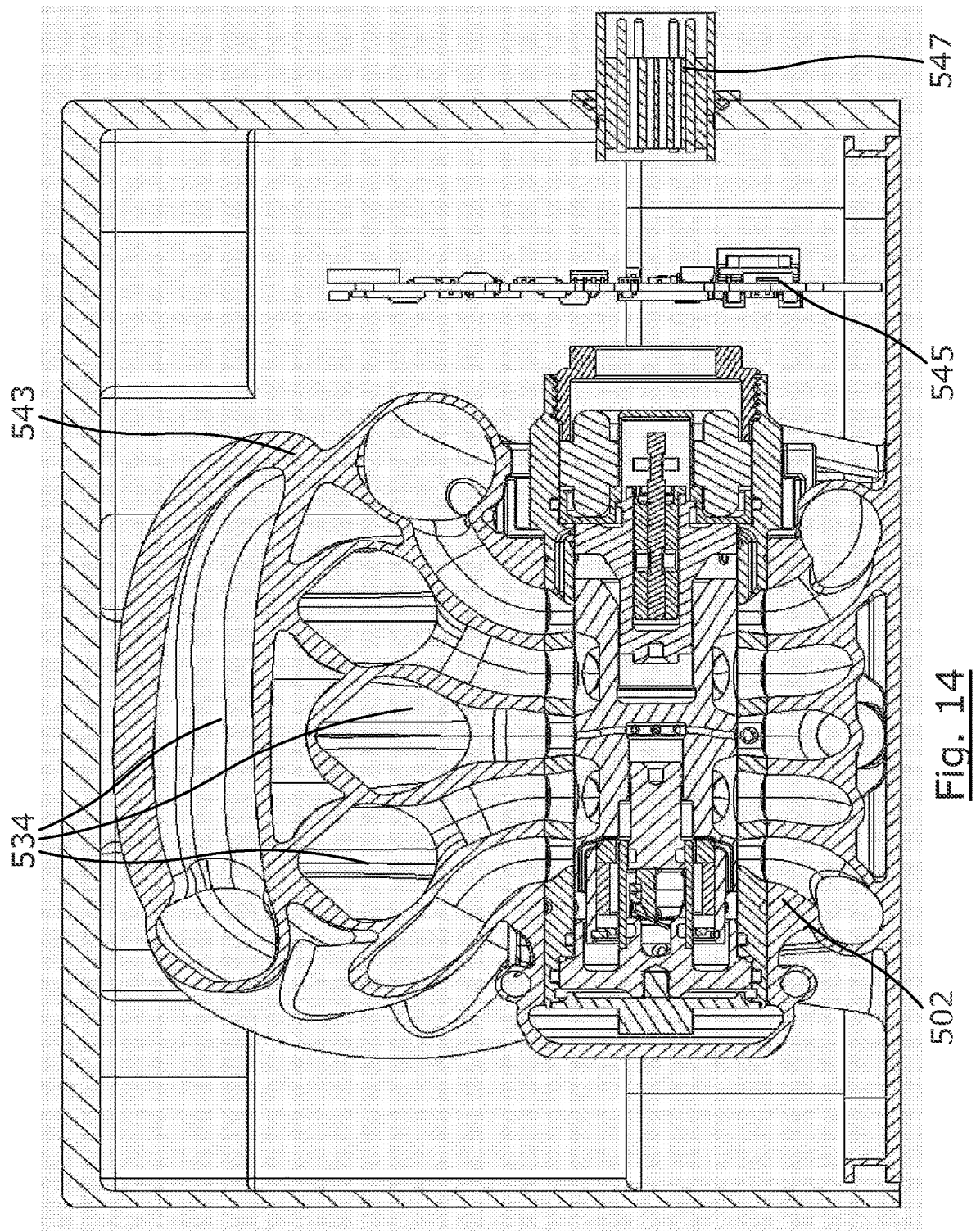
FIG. 14 is a cross-sectional side view of a valve of the sixth embodiment.

FIG. 14 shows the valve 502 of FIG. 13 in the complete manifold 543 including flow galleries 543, control electronics 545 and connector 547.

Figure 15A:
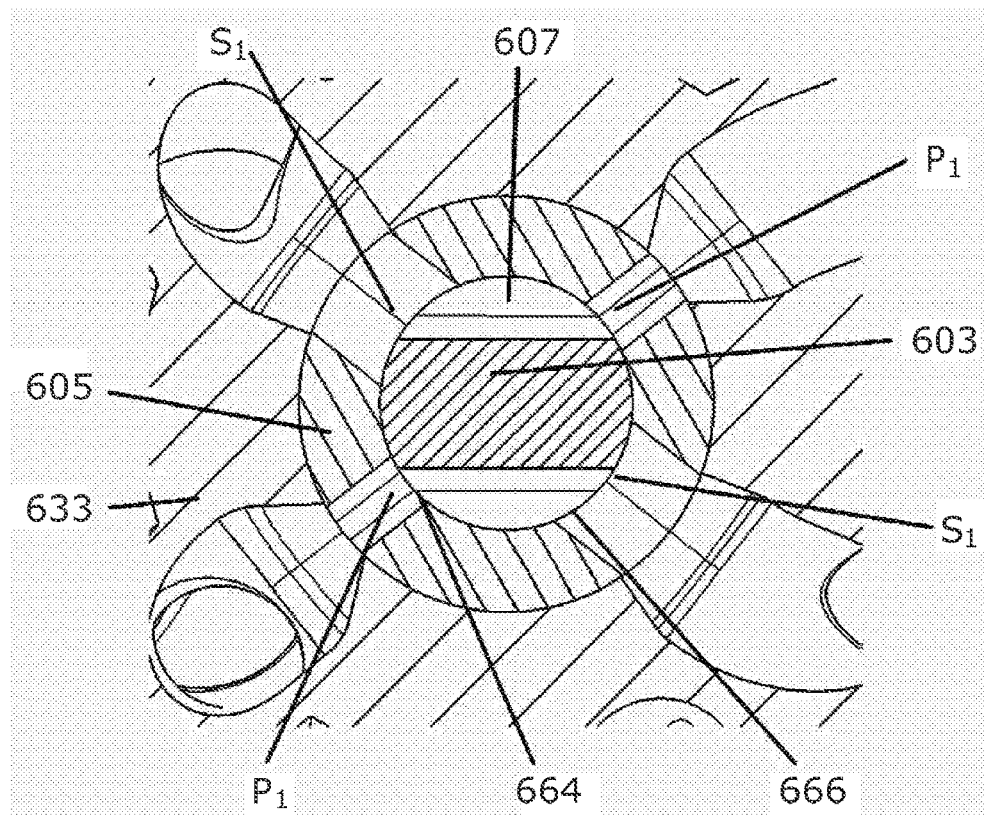
FIG. 15 is a cross-sectional view of (a) a first layer and (b) a second layer of a servo valve in accordance with a eighth example embodiment.
Figure 15B:
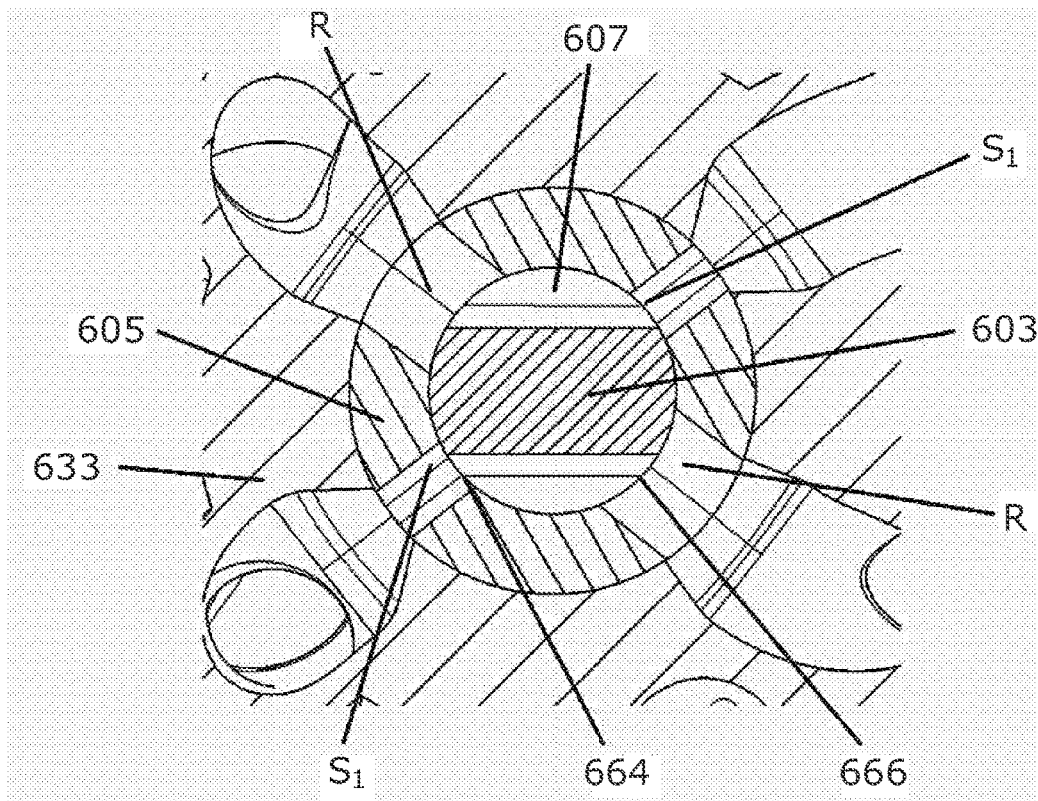

FIGS. 15(a) and (b) show two layers of a servo valve in accordance with an eighth example embodiment of the invention. Only those elements of the present embodiment which differ with respect to the first embodiment will be discussed here. A first layer of the valve (shown in FIG. 15(a)) comprises a housing 605 located within a manifold 633 defining four ports; two pressure ports P and two service ports $S_1$. In use, spool 603 can rotate to an open position so the fluid can flow from the pressure port P to the service ports $S_1$. A second layer of the valve (shown in FIG. 15(b)) comprises a further set of four ports formed in housing 605; two return ports R and two service ports $S_1$. In both layers, ports of the same type are located on opposite sides of the cavity 607 to each other. In the second layer, the location of the service ports $S_1$ is displaced by 90 degrees with respect to their position in the first layer. In each layer a pressure port P or return port R is located between the two service ports $S_1$. In the first layer of the valve, the width of the service ports $S_1$ is greater than the width of the pressure ports P. In the second layer, the width of the service ports $S_1$ is less than the width of the return ports R.

In use, when the spool is in the open position a flow path is created between two ports. Fluid will flow along that path from the higher-pressure of the two ports to the lower-pressure of the two ports. Thus, in the first layer fluid flows from the pressure ports P to the service ports $S_1$. In the second layer, fluid flows from the service ports $S_1$ to the return ports R. As can be seen in FIG. 15(a) the orifice 660 defined by the pressure port P and the surface of the spool 603 has a smaller cross-sectional area that the orifice 662 defined between the spool 603 and the service port S1. As a consequence, the choke point for flow along the flow path between the pressure port P and the return port R is located adjacent to the pressure port P. The flow between the two ports is therefore metered at this higher-pressure (in comparison to the service-port) edge. Similarly, in the second layer, the cross-sectional area of the orifice 664 between the service ports $S_1$ and the spool 603 has a smaller cross-sectional area that the orifice 666 defined between the spool 603 and the return port R. The flow between the two ports is therefore metered at the (relatively higher-pressure) service-port edge.

It is believed that, when metering using the higher-pressure edge, the flow exiting the metering port carries significant inertia so continues along the face of the spool 603, only starting to become noticeably detached at the end, giving only a small pocket of slow moving fluid in the region near the lower-pressure edge. This gives a fairly even pressure distribution across the face of the spool, thereby reducing the torque loading on the spool. In contrast, when metering on the lower pressure edge, flow entering the metering orifice is 'sucked' from the region immediately adjacent to the metering orifice, leaving a large volume of slow moving fluid elsewhere. This means that most of the spool face will see a high pressure, though towards the outer circumference of the spool (where the lever arm for the torque is greatest) there is an area of fast moving fluid giving rise to low pressure, thereby generating a torque load. Accordingly, in servo valves in accordance with the present embodiment, torque loading on the spool may be reduced as a result of metering the flow at the higher-pressure port in any pair of ports.

In a further embodiment related to the sixth embodiment, the valve comprises two further layers. The third layer comprises two pressure ports P and two service ports $S_2$ connected via the housing to a different service, for example the other side of a piston to $S_1$. The metering orifice on each flow path is formed, at least in part, by the pressure port P. The fourth layer comprises two service ports $S_2$ (in this layer the higher-pressure ports) and two return ports R. The metering orifice on each flow path is formed, at least in part, by the service port $S_2$. Accordingly, servo valves in accordance with the present example embodiment may allow for metering at the higher-pressure edge in a four-way valve.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The present invention can be described in accordance with the following numbered clauses.

1. A rotary servo valve for controlling fluid flow, the servo valve comprising:
    a housing portion defining a cylindrical cavity and a first layer of ports, the first layer of ports having three pairs of ports, including a first pair of service ports, the ports of each pair being arranged so as to be diametrically opposed about the cylindrical cavity, for example wherein the three pairs of ports of the first layer are located at substantially the same axial position along the length of the cavity; and
    a spool portion comprising two opposing indented sides and two opposing sides having an increased radius relative to the indented sides, each side of increased radius extending between the two indented sides, and wherein
    the spool portion is mounted for rotation relative to the cylindrical cavity, from a neutral position in which each side of increased radius blocks at least one port so as to prevent fluid flow through the valve, to an open position in which a fluid flow path is provided between each service port of the first pair and a corresponding one of the remaining ports, each fluid flow path being defined at least in part by one of the indented sides.
2. A rotary servo valve according to clause 1, wherein each side of increased radius has a radius that is constant along the length of the side.
3. A rotary servo valve according to clause 1 or clause 2, wherein each indented side is a straight side.
4. A rotary servo valve according to clause 1 or clause 2, wherein each indented side is a concave side.
5. A rotary servo valve according to any previous clause, wherein the spool portion is arranged to rotate in a second, opposite, direction from said neutral position to a second open position in which a fluid flow path is provided between each service port and another of the remaining ports, each fluid flow path being defined at least in part by one of the indented sides.
6. A rotary servo valve according to any previous clause, wherein the three pairs of ports are the first pair of service ports, a second pair of service ports and either one pair of pressure ports or one pair of return ports.
7. A rotary servo valve according to any of clauses 1 to 5, wherein the three pairs of ports are the first pair of service ports, a pair of pressure ports and a pair of return ports.
8. A rotary servo valve according to any previous clause, wherein each of the ports in two of the three pairs of ports have a first smaller minimum width, whilst each of the ports in the other pair of ports have a second greater minimum width.
9. A rotary servo valve according to clause 8, wherein each port having a first smaller minimum width is a channel with a stepped profile.
10. A rotary servo valve according to clause 8 or clause 9, wherein each port having a second greater minimum width is a channel with straight sides.
11. A rotary servo valve according to any previous clause, wherein the housing is formed using additive manufacturing.
12. A rotary servo valve according to any previous clause, further comprising a flow divider positioned inside each service port.
13. A rotary servo valve according to any previous clause, wherein the spool comprises one or more through conduits extending from one indented side to the other indented side.
14. A rotary servo valve according to any previous clause, wherein the rotary servo valve is configured to be directly driven by an electric motor.
15. A rotary servo valve according to any preceding clause, comprising
    a housing portion defining a cylindrical cavity and a second layer of ports, the second layer having three pairs of ports including a first pair of service ports, the ports of each pair arranged so as to be diametrically opposed about the cylindrical cavity, for example wherein the three pairs of ports of the second layer are located at substantially the same axial position along the length of the cavity;

and a second spool portion comprising two opposing indented sides and two opposing sides having an increased radius relative to the indented sides, each side of increased radius extending between the two indented sides, and wherein the second spool portion is mounted for rotation relative to the cylindrical cavity, from a neutral position in which each side of increased radius of the second spool portion blocks at least one port of the second layer so as to prevent fluid flow through the valve, to an open position in which a fluid flow path is provided between each service port of the second pair of the second layer and a corresponding one of the remaining ports, each fluid flow path being defined at least in part by one of the indented sides of the second portion.

16. A rotary servo valve according to clause 15 when dependent on clause 6, wherein the three pairs of ports in the second layer are the first pair of service ports, the second pair of service ports and the other one of a pair of pressure ports or a pair of return ports.

17. A rotary servo valve according to clause 15 when dependent on clause 7, wherein the three pairs of ports in the second layer are a second pair of service ports, a pair of pressure ports and a pair of return ports.

18. A rotary servo valve according to any of clauses 15 to 17, wherein the first and second spool portions are integrally formed to provide a common spool, and/or the first and second housing portions are integrally formed to provide a common housing.

19. A two-stage servo valve for controlling fluid flow, wherein the first stage valve is a rotary valve, and the second stage valve is a linear valve mounted coaxially with the rotary valve.

20. A two-stage servo valve according to clause 19, wherein the first stage valve comprises a first stage spool, the second stage valve comprises a second stage spool and at least a portion of the first stage spool is mounted concentrically with a portion of the second stage spool.

21. A two-stage servo valve according to any of clauses 19 and 20, wherein the second stage valve comprises a first cavity and a second cavity, the valve being configured such that fluid in the first and second cavities exerts a force on the second stage spool such that, in use, the second stage spool moves in response to a pressure difference between the first and second cavities.

22. A two-stage servo valve according to clause 21 wherein the first and/or second cavity extends into the second stage spool from a respective distal end.

23. A two-stage servo valve according to clause 21 or 22, wherein a portion of the first stage spool is located within the first cavity.

24. A two-stage servo valve according to any of clauses 21 to 23, wherein the rotary valve is a three-way valve configured to control a single service flow, and where the valve is configured such that the single service flow is provided to one of the first or second cavity, a supply pressure being provided to the other of the first and second cavity.

25. A two-stage valve according to clause 24, wherein the surface area of the spool corresponding to the cavity receiving the service flow is twice the surface area of the spool corresponding to the cavity receiving the supply pressure.

26. A two-stage servo valve according to any of clauses 21 to 23, wherein the rotary valve is a four-way valve configured to control a first service flow and a second, different, service flow, and wherein the valve is configured such that one of the first and second service flow is received in the first cavity and the other of the first and second service flow is received in the second cavity.

27. A two-stage servo valve according to clause 26 wherein surface area of the spool corresponding to the cavity receiving the first service flow is the same as the surface area of the spool corresponding to the cavity receiving the second service flow.

28. A two-stage servo valve according to any of clauses 19 to 27 wherein the first stage valve is the rotary servo valve of any of clauses 1 to 18.

29. A rotary servo valve comprising two layers, each layer comprising a housing portion defining a cavity and four fluid ports including two service ports; the four fluid ports providing a pair of higher-pressure ports and a pair of lower-pressure ports, the ports of each pair being located diametrically opposite each other around the cavity; and a spool portion having at least two indented sides, the spool being mounted for rotation relative to the housing between a neutral position in which the spool portion blocks at least one pair of ports of the layer such that fluid flow through the cavity is prevented and an open position in which a fluid flow path is provided between each higher-pressure port and a lower-pressure port via an indented side; and wherein the spool and housing portions are configured such that flow via each fluid flow path is metered by a first orifice defined by the spool and the higher-pressure port.

30. A rotary servo valve according to clause 29, wherein a second orifice is defined by the spool and the lower-pressure port, the surface area of the second orifice being less than the surface area of the first orifice.

31. A rotary servo valve according to clause 29 or clause 30, wherein the spool and housing portion are configured such that the component of flow parallel to the indented surface of the spool is greater in the region adjacent the higher-pressure orifice than the region adjacent the lower-pressure orifice, when the spool is in the open position.

32. A rotary servo valve according to any of clauses 29 to 31, wherein the width of the higher-pressure port is less than the width of the lower-pressure port.

33. A rotary servo valve according to any of clauses 29 to 32, wherein the higher-pressure ports and lower-pressure ports of the first layer are pressure ports and service ports respectively; and the higher-pressure ports and lower-pressure ports of the second layer are service ports and return ports respectively.

34. A rotary servo valve according to any of clauses 29 to 32, wherein the valve comprises four layers, and the service ports of the first layer are first service ports, the service ports of the second layer are second service ports, the higher-pressure ports and lower-pressure ports of the third layer are pressure ports and second service ports respectively; and the higher-pressure ports and lower-pressure ports of the second layer are first service ports and return ports respectively.

35. A rotary servo valve according to any of clauses 29 to 34, wherein each spool portion comprises two opposing indented sides and two opposing sides having an increased radius relative to the indented sides, each side of increased radius extending between the two indented sides.

36. A rotary servo valve according to clause 35, wherein each side of increased radius has a constant radius.
37. A rotary servo valve according to clause 35 or 36, wherein each indented side is a straight side or a concave side.
38. A method of controlling flow through a rotary servo valve, the rotary servo valve comprising two layers, each layer comprising
a housing portion defining a cavity and four fluid ports including two service ports; the four fluid ports providing a pair of higher-pressure ports and a pair of lower-pressure ports, the ports of each pair being located diametrically opposite each other around the cavity; and
a spool portion
the method comprising rotating the spool portion between a neutral position in which the spool portion blocks at least one pair of ports of the layer such that fluid flow through the cavity is prevented and an open position in which a fluid flow path is provided between each higher-pressure port and a lower-pressure port; and
metering the flow in each layer using an orifice defined by the spool and the higher-pressure port of that layer.

The invention claimed is:
1. A rotary servo valve for controlling fluid flow, the servo valve comprising:
a housing portion defining a cylindrical cavity and a first layer of ports, the first layer of ports having only three pairs of ports, wherein the three pairs of ports are a first pair of service ports, a pair of pressure ports, and a pair of return ports, the ports of each pair being arranged so as to be diametrically opposed about the cylindrical cavity, the three pairs of ports of the first layer being located at substantially the same axial position along the length of the cavity; and
a spool portion comprising two opposing indented sides and two opposing sides having an increased radius relative to the indented sides, each side of increased radius extending between the two indented sides, and wherein
the spool portion is mounted for rotation relative to the cylindrical cavity, from a neutral position in which each side of increased radius blocks at least one port so as to prevent fluid flow through the valve, to an open position in which a fluid flow path is provided between each service port of the first pair and a corresponding one of the remaining ports, each fluid flow path being defined at least in part by one of the indented sides.
2. A rotary servo valve according to claim 1, wherein each side of increased radius has a radius that is constant along the length of the side.
3. A rotary servo valve according to claim 1, wherein each indented side is a straight side.
4. A rotary servo valve according to claim 1, wherein each indented side is a concave side.
5. A rotary servo valve according to claim 1, wherein the spool portion is arranged to rotate in a second, opposite, direction from said neutral position to a second open position in which a fluid flow path is provided between each service port and another of the remaining ports, each fluid flow path being defined at least in part by one of the indented sides.
6. A rotary servo valve according to claim 1, wherein each of the ports in two of the three pairs of ports have a first smaller minimum width, whilst each of the ports in the other pair of ports have a second greater minimum width.

7. A rotary servo valve according to claim 6, wherein each port having a first smaller minimum width is a channel with a stepped profile.
8. A rotary servo valve according to claim 6, wherein each port having a second greater minimum width is a channel with straight sides.
9. A rotary servo valve according to claim 1, wherein the housing is formed using additive manufacturing.
10. A rotary servo valve according to claim 1, further comprising a flow divider positioned inside each service port.
11. A rotary servo valve according to claim 1, wherein the spool comprises one or more through conduits extending from one indented side to the other indented side.
12. A rotary servo valve according to claim 1, wherein the rotary servo valve is configured to be directly driven by an electric motor.
13. A rotary servo valve according to claim 1, comprising
a second housing portion defining a cylindrical cavity and a second layer of ports, the second layer having three pairs of ports including a first pair of service ports, the ports of each pair arranged so as to be diametrically opposed about the cylindrical cavity, the three pairs of ports of the second layer being located at substantially the same axial position along the length of the cavity;
and a second spool portion comprising two opposing indented sides and two opposing sides having an increased radius relative to the indented sides, each side of increased radius extending between the two indented sides, and wherein
the second spool portion is mounted for rotation relative to the cylindrical cavity, from a neutral position in which each side of increased radius of the second spool portion blocks at least one port of the second layer so as to prevent fluid flow through the valve, to an open position in which a fluid flow path is provided between each service port of the second pair of the second layer and a corresponding one of the remaining ports, each fluid flow path being defined at least in part by one of the indented sides of the second portion.
14. A rotary servo valve according to claim 13, wherein the three pairs of ports in the second layer are a second pair of service ports, a pair of pressure ports and a pair of return ports.
15. A rotary servo valve according to claim 13, wherein the first and second spool portions are integrally formed to provide a common spool, and/or the first and second housing portions are integrally formed to provide a common housing.
16. A method of controlling fluid flow using a rotary servo valve, the servo valve comprising:
a housing defining a cavity and a first layer of ports, the first layer of ports having only three pairs of ports, wherein the three pairs of ports are a first pair of service ports, a pair of pressure ports, and a pair of return ports, the ports of each pair being arranged so as to be diametrically opposed about the cavity the three pairs of ports of the first layer being located at substantially the same axial position along the length of the cavity; and
a spool portion comprising two opposing indented sides and two opposing sides having an increased radius relative to the indented sides, each side of increased radius extending between the two indented sides, and
wherein the method comprises rotating the spool portion from a neutral position in which each side of increased radius blocks at least one port so as to prevent fluid flow through the valve, to an open position in which fluid flows between each of the service ports of the first pair and a corresponding port of one of the remaining pairs of ports, the fluid passing over an indented side as it flow between said ports.

17. A rotary servo valve for controlling fluid flow, the servo valve comprising:

a housing portion defining a cylindrical cavity and a first layer of ports, the first layer of ports having three pairs of ports, including a first pair of service ports, the ports of each pair being arranged so as to be diametrically opposed about the cylindrical cavity, the three pairs of ports of the first layer being located at substantially the same axial position along the length of the cavity; and a spool portion comprising two opposing indented sides and two opposing sides having an increased radius relative to the indented sides, each side of increased radius extending between the two indented sides, and wherein the spool portion is mounted for rotation relative to the cylindrical cavity, from a neutral position in which each side of increased radius blocks at least one port so as to prevent fluid flow through the valve, to an open position in which a fluid flow path is provided between each service port of the first pair and a corresponding one of the remaining ports, each fluid flow path being defined at least in part by one of the indented sides;

a second housing portion defining a cylindrical cavity and a second layer of ports, the second layer having three pairs of ports including a first pair of service ports, the ports of each pair arranged so as to be diametrically opposed about the cylindrical cavity, the three pairs of ports of the second layer being located at substantially the same axial position along the length of the cavity;

and a second spool portion comprising two opposing indented sides and two opposing sides having an increased radius relative to the indented sides, each side of increased radius extending between the two indented sides, and wherein the second spool portion is mounted for rotation relative to the cylindrical cavity, from a neutral position in which each side of increased radius of the second spool portion blocks at least one port of the second layer so as to prevent fluid flow through the valve, to an open position in which a fluid flow path is provided between each service port of the second pair of the second layer and a corresponding one of the remaining ports, each fluid flow path being defined at least in part by one of the indented sides of the second portion.

18. The rotary servo valve according to claim 17, wherein the first and second spool portions are integrally formed to provide a common spool, and/or the first and second housing portions are integrally formed to provide a common housing.

* * * * *